United States Patent
Hong et al.

(10) Patent No.: US 10,866,674 B2
(45) Date of Patent: Dec. 15, 2020

(54) DISPLAY DEVICE

(71) Applicant: Samsung Display Co., Ltd., Yongin-si (KR)

(72) Inventors: Won Ki Hong, Suwon-si (KR); Tae Hee Lee, Hwaseong-si (KR); Sung Kook Park, Suwon-si (KR); So Hee Park, Cheonan-si (KR); Hee Seomoon, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/413,493

(22) Filed: May 15, 2019

(65) Prior Publication Data

US 2020/0057522 A1 Feb. 20, 2020

(30) Foreign Application Priority Data

Aug. 17, 2018 (KR) ......................... 10-2018-0096037

(51) Int. Cl.
*G06F 3/041* (2006.01)
*G06F 1/16* (2006.01)

(52) U.S. Cl.
CPC .......... *G06F 3/0414* (2013.01); *G06F 1/1626* (2013.01); *G06F 1/1643* (2013.01)

(58) Field of Classification Search
CPC .... G06F 3/0414; G06F 1/1626; G06F 1/1643; G06F 3/04142; G06F 1/16; G06F 1/18; G06F 3/041; G06F 3/0488; G06F 3/0412; G06F 3/016; G06F 3/04886; G06F 3/0487; G06F 1/1684; G06F 1/183; G06F 1/182; G06F 2203/04105
See application file for complete search history.

(56) References Cited

U.S. PATENT DOCUMENTS

| | | | |
|---|---|---|---|
| 8,654,524 B2 | 2/2014 | Pance et al. | |
| 9,948,343 B2 | 4/2018 | Moon et al. | |
| 2008/0238884 A1* | 10/2008 | Harish | G06F 3/016 345/174 |
| 2012/0105358 A1* | 5/2012 | Momeyer | G06F 3/0414 345/174 |
| 2012/0204657 A1* | 8/2012 | Suzuki | G01L 1/20 73/862.68 |

(Continued)

FOREIGN PATENT DOCUMENTS

| | | |
|---|---|---|
| EP | 3136693 | 3/2017 |
| EP | 3312706 | 4/2018 |

(Continued)

OTHER PUBLICATIONS

Partial European Search Report dated Dec. 4, 2019, issued in European Patent Application No. 19189857.6.

(Continued)

*Primary Examiner* — Carolyn R Edwards
(74) *Attorney, Agent, or Firm* — H.C. Park & Associates, PLC

(57) ABSTRACT

A display device includes: a display panel; a first force sensor disposed under the display panel; and a first waterproof member disposed under the display panel and disposed on an outer side of the first force sensor, wherein a height of the first waterproof member is larger than a height of the first force sensor.

22 Claims, 42 Drawing Sheets

(56) References Cited

U.S. PATENT DOCUMENTS

| | | | |
|---|---|---|---|
| 2012/0274599 A1 | 11/2012 | Schediwy | |
| 2013/0155627 A1 | 6/2013 | Mareno et al. | |
| 2014/0028575 A1 | 1/2014 | Parivar et al. | |
| 2014/0085281 A1* | 3/2014 | Lim | G09G 3/3291 345/206 |
| 2014/0092064 A1 | 4/2014 | Bernstein et al. | |
| 2015/0237743 A1 | 8/2015 | Sun et al. | |
| 2016/0062517 A1 | 3/2016 | Meyer et al. | |
| 2016/0066412 A1 | 3/2016 | Choi et al. | |
| 2017/0063421 A1* | 3/2017 | Moon | H04M 1/0266 |
| 2017/0315003 A1 | 11/2017 | Lai et al. | |
| 2018/0004333 A1 | 1/2018 | Jeong et al. | |
| 2018/0033571 A1 | 2/2018 | Choi et al. | |
| 2018/0081400 A1 | 3/2018 | Pandya et al. | |
| 2018/0081485 A1* | 3/2018 | Shuma | G06F 3/044 |
| 2018/0160545 A1 | 6/2018 | Kim et al. | |
| 2018/0188874 A1* | 7/2018 | Cho | G06F 3/0488 |

FOREIGN PATENT DOCUMENTS

| | | |
|---|---|---|
| JP | 6087394 | 1/2017 |
| KR | 10-2016-0149982 | 12/2016 |
| KR | 10-1841583 | 3/2018 |

OTHER PUBLICATIONS

Extended European Search Report dated Apr. 23, 2020 issued to European Patent Application No. 19189857.6.

* cited by examiner

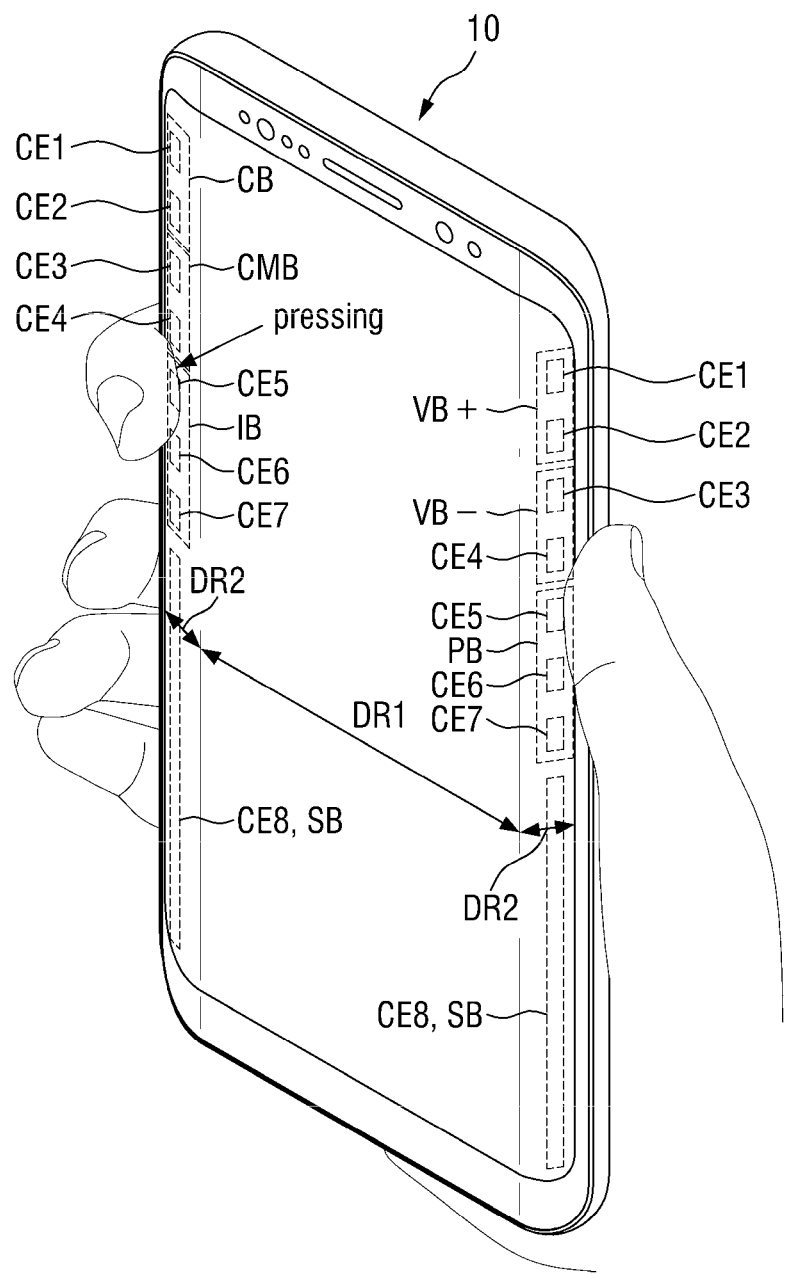

DISPLAY DEVICE

CROSS REFERENCE TO RELATED APPLICATION

This application claims priority from and the benefit of Korean Patent Application No. 10-2018-0096037, filed on Aug. 17, 2018, which is hereby incorporated by reference for all purposes as if fully set forth herein.

BACKGROUND

Field

Exemplary embodiments/implementations of the invention relate generally to a display device.

Discussion of the Background

Electronic devices that display images to a user, such as a smart phone, a tablet PC, a digital camera, a laptop computer, a navigation device, and a smart TV, include a display device for displaying images. Such a display device includes a display panel for generating and displaying an image and various input means.

Recently, a touch panel that recognizes a touch input has been widely employed for display devices of smart phones or tablet PCs. By virtue of its convenience, touch panels have increasingly replaced existing physical input means such as a keypad. Moreover, research is being conducted to achieve various input ways by disposing a force sensor on a display device.

The above information disclosed in this Background section is only for understanding of the background of the inventive concepts, and, therefore, it may contain information that does not constitute prior art.

SUMMARY

Devices constructed in accordance with exemplary embodiments of the inventive concepts provide a display device with waterproof and dustproof capabilities by disposing force sensors under the display panel.

Additional features of the inventive concepts will be set forth in the description which follows, and in part will be apparent from the description, or may be learned by practice of the inventive concepts.

According to an exemplary embodiment, a display device includes: a display panel; a first force sensor disposed under the display panel; and a first waterproof member disposed under the display panel and disposed on an outer side of the first force sensor, wherein a height of the first waterproof member is larger than a height of the first force sensor.

The display device may further include: a first bump disposed on or under the first force sensor.

A height of the first bump may be larger than a height of the first force sensor.

A height of the first waterproof member may be larger than a sum of a height of the first force sensor and a height of the first bump.

The first force sensor may include a force sensitive cell, and an area of the first bump may be smaller than an area of the force sensitive cell.

The force sensitive cell may include a driving electrode and a sensing electrode disposed on a surface of the first substrate; and a force sensing layer disposed on a surface of the second substrate that faces the surface of the first substrate, wherein the first bump may be smaller than the force sensing layer when viewed from a top.

The display device may further include: a frame disposed under the first force sensor.

The display device may further include: a first adhesive member for attaching the first force sensor to a lower surface of the display panel; and a second adhesive member for attaching the first force sensor to an upper surface of the frame, wherein the first waterproof member may be attached to the lower surface of the display panel and the upper surface of the frame.

The frame may include a groove formed in an upper surface of the frame, and the first force sensor and the first waterproof member are accommodated in the groove.

The height of the first waterproof member may be larger than a height of the groove.

The display device may further include: a second force sensor disposed under the display panel, wherein the first waterproof member may be disposed on an outer side of the second force sensor.

The first force sensor may be disposed on one side of the display panel while the second force sensor may be disposed on an opposite side of the display panel.

The display panel may include a flat portion and a curved portion extended from the flat portion, and the first waterproof member and the first force sensor may be disposed on the curved portion.

According to another exemplary embodiment, a display device includes: a display panel; a first force sensor disposed under the display panel; and a first waterproof member disposed under the display panel and disposed on an outer side of the first force sensor and on an upper surface or a lower surface of the first force sensor.

The first waterproof member may be disposed between the upper surface of the first force sensor and a lower surface of the display panel.

The display device may further include: a frame disposed under the first force sensor, wherein the first waterproof member may be disposed between the lower surface of the first force sensor and an upper surface of the frame.

The first waterproof member may include: a base film; a first adhesive layer disposed on a surface of the base film and attached to the upper surface or the lower surface of the first force sensor; and a second adhesive layer disposed on opposite surface of the base film and attached to a lower surface of the display panel or the upper surface of the frame.

The display device may further include: a cable hole passing through the frame; a display circuit board attached to one side of the display panel and bent toward the lower surface of the display panel; and a cable connected to a connector of the display circuit board and passing through the cable hole.

The first force sensor may include a first recess for exposing the cable hole on one side thereof, and the first waterproof member may include a second recess for exposing the cable hole on one side thereof.

A width of the second recess may be larger than a width of the first recess.

The display device may further include: a main circuit board disposed under the frame, wherein the cable may be connected to a main connector disposed on a lower surface of the main circuit board.

According to another exemplary embodiment, a display device may include: a display panel; a first force sensor disposed under the display panel; a frame disposed under the first force sensor; and a first waterproof member disposed under the display panel and disposed between an upper surface of the first force sensor and a lower surface of the display panel and between a lower surface of the first force sensor and an upper surface of the frame.

The display device may further include: a first bump disposed on the first force sensor, wherein the first waterproof member includes: a 1A waterproof member disposed on a lower surface and a side surface of the first force sensor; and a 1B waterproof member disposed on an upper surface of the first bump.

The display device may further include: a first bump disposed under the first force sensor, wherein the first waterproof member includes: a 1A waterproof member disposed on an upper surface and a side surface of the first force sensor; and a 1B waterproof member disposed on a lower surface of the first bump.

The display device may further include: a first bump disposed on the first force sensor, wherein the first waterproof member includes a 1A waterproof member disposed on the lower surface of the first force sensor and side surfaces of the first force sensor; a 1B waterproof member disposed on a part of the upper surface of the first force sensor and a part of each of the side surfaces of the first force sensor that are exposed without being covered by the first bump; and a 1C waterproof member disposed on other part of the upper surface of the first force sensor and other part of each of the side surfaces of the first force sensor that are exposed without being covered by the first bump.

The display device may further include: a first bump disposed under the first force sensor, wherein the first waterproof member includes a 1A waterproof member disposed on the upper surface of the first force sensor and side surfaces of the first force sensor; a 1B waterproof member disposed on a part of the lower surface of the first force sensor and a part of each of the side surfaces of the first force sensor that are exposed without being covered by the first bump; and a 1C waterproof member disposed on other part of the lower surface of the first force sensor and other part of each of the side surfaces of the first force sensor that are exposed without being covered by the first bump.

The display device may further include: a 1A bump disposed on the first force sensor; and a 1B bump disposed under the first force sensor, wherein the first waterproof member includes: a 1A waterproof member disposed on a part of the upper surface and a part of each of the side surfaces of the first force sensor that are exposed without being covered by the 1A bump; a 1B waterproof member disposed on a part of the lower surface and a part of each of the side surfaces of the first force sensor that are exposed without being covered by the 1B bump; a 1C waterproof member disposed on other part of the lower surface and other part of each of the side surfaces of the first force sensor that are exposed without being covered by the 1B bump; and a 1D waterproof member disposed on other part of the upper surface and other part of each of the side surfaces of the first force sensor that are exposed without being covered by the 1A bump.

According to an exemplary embodiment of the inventive concepts, a waterproof member is disposed on the outer side of force sensors, so that moisture and dust can be prevented from permeating between the display panel and the frame by the waterproof member. That is to say, a display device with waterproof and dustproof capabilities can be produced.

According to an exemplary embodiment of the inventive concepts, a recess in the form of a notch is formed in a force sensor so that a cable hole of a frame is not covered. Accordingly, a connection cable connected to the display circuit board can be extended below the frame through the cable hole and connected to the main connector of the main circuit board. As a result, the display circuit board can be connected to the main circuit board in a stable manner.

According to an exemplary embodiment of the inventive concepts, a force sensor is disposed on a curved portion of the display device, so that the sensor can be used on behalf of physical buttons such as volume control buttons, a power button, a call button, a camera button, an Internet button, and a squeezing sensing button.

According to an exemplary embodiment of the inventive concepts, when there is a user's input through an input sensing device including the force sensor, the vibration generator vibrates, so that a haptic feedback can be provided to the user.

According to an exemplary embodiment of the inventive concepts, a waterproof member and a force sensor can be implemented integrally, and thus there is an advantage that it is not necessary to determine the height of the waterproof member by taking into account the height of the force sensor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIGS. 10A and 10B are views for illustrating display devices employing the first and second force sensors as physical buttons according to an exemplary embodiment.

DETAILED DESCRIPTION OF THE EMBODIMENTS

Figure 1:
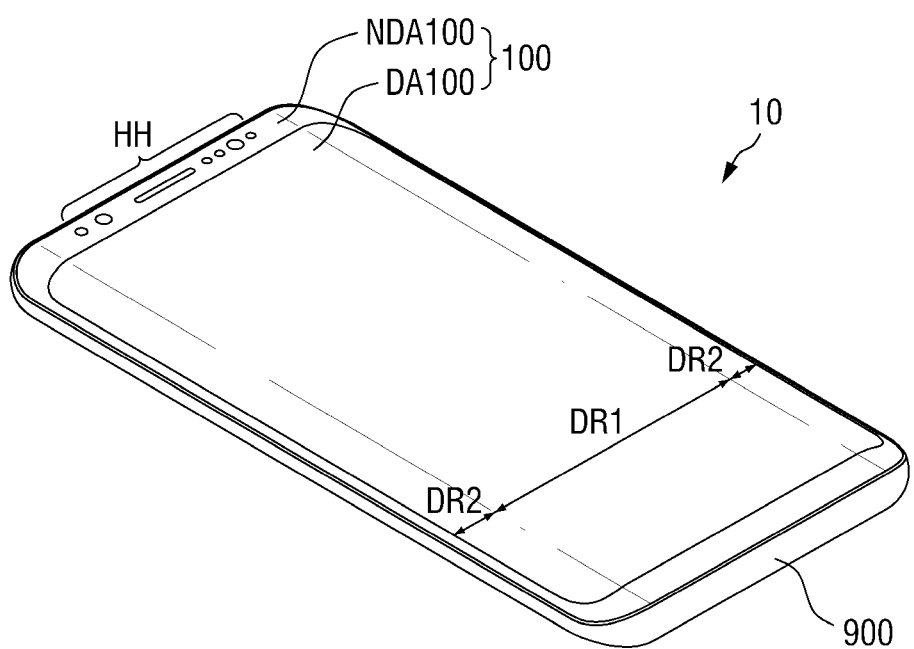
FIG. 1 is a perspective view of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z-axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
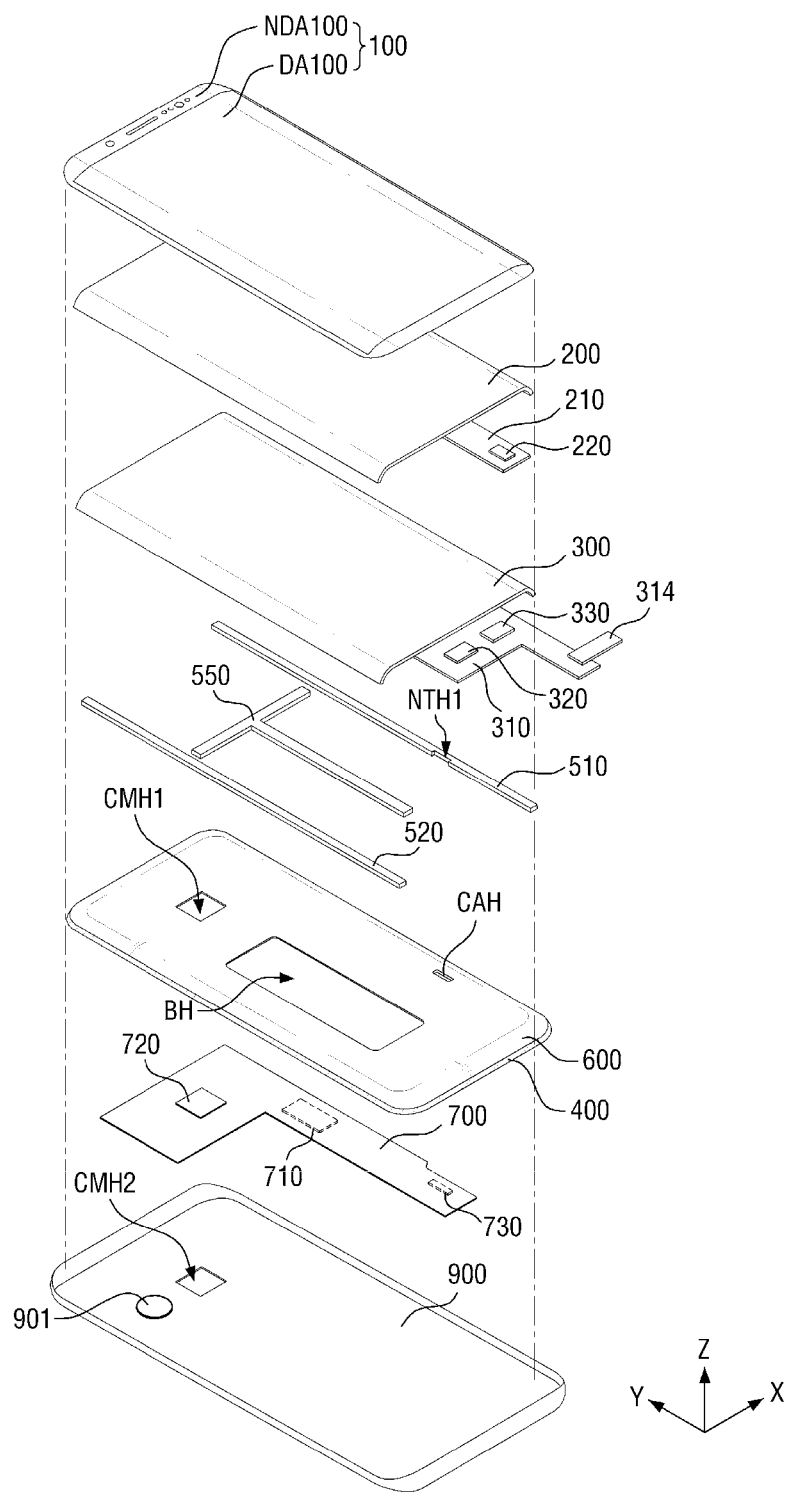
FIG. 2 is an exploded, perspective view of a display device according to an exemplary embodiment.

FIG. 1 is a perspective view of a display device according to an exemplary embodiment. FIG. 2 is an exploded, perspective view of a display device according to an exemplary embodiment.

Referring to FIGS. 1 and 2, a display device 10 according to an exemplary embodiment includes a cover window 100, a touch sensing device 200, a touch circuit board 210, a touch driver 220, a display panel 300, a display circuit board 310, a display driver 320, a force sensing unit 330, a first force sensor 510, a second force sensor 520, a force sensing circuit board 550, a frame 600, a waterproof member 400, a main circuit board 700, and a bottom cover 900.

As used herein, the terms "above," "top" and "upper surface" refer to the side of the display panel 300 in the z-axis direction where the window 100 is disposed, whereas the terms "below," "bottom" and "lower surface" refer to the opposite side of the display panel 300 in the z-axis direction where the frame 600 is disposed. As used herein, the terms "left," "right," "upper" and "lower" indicate relative positions when the display panel 300 is viewed from the top. For example, the "left side" refers to the opposite direction indicated by the arrow of the x-axis, the "right side" refers to the direction indicated by the arrow of the x-axis, the "upper side" refers to the direction indicated by the arrow of the y-axis, and the "lower side" refers to the opposite direction indicated by the arrow of the y-axis.

The display device 10 may have a rectangular shape when viewed from the top. For example, the display device 10 may have a rectangular shape having shorter sides in a first direction (x-axis direction) and longer sides in a second direction (y-axis direction) when viewed from the top as shown in FIGS. 1 and 2. Each of the corners where the short side in the first direction (x-axis direction) meets the longer side in the second direction (y-axis direction) may be rounded with a predetermined curvature or may be a right angle. The shape of the display device 10 when viewed from the top is not limited to a rectangular shape, but may be formed in another polygonal shape, circular shape, or elliptical shape.

The display device 10 may include a first region DR1 which is formed flat, and a second region DR2 extended from the right and left sides of the first region DR1. The second region DR2 may be formed flat or may be curved. When the second region DR2 is formed flat, the angle formed by the first region DR1 and the second region DR2 may be an obtuse angle. When the second region DR2 is formed as a curved surface, it may have a constant curvature or a varying curvature.

Although the second areas DR2 are extended from the left and right sides of the first region DR1 in FIG. 1, this is merely illustrative. That is to say, the second region DR2 may be extended from only one of the right and left sides of the first region DR1. Alternatively, the second region DR2 may be extended from at least one of upper and lower sides of the first region DR1, as well as the left and right sides. In the following description, the second areas DR2 are disposed at the left and right edges of the display device 10, respectively.

Figure 11:
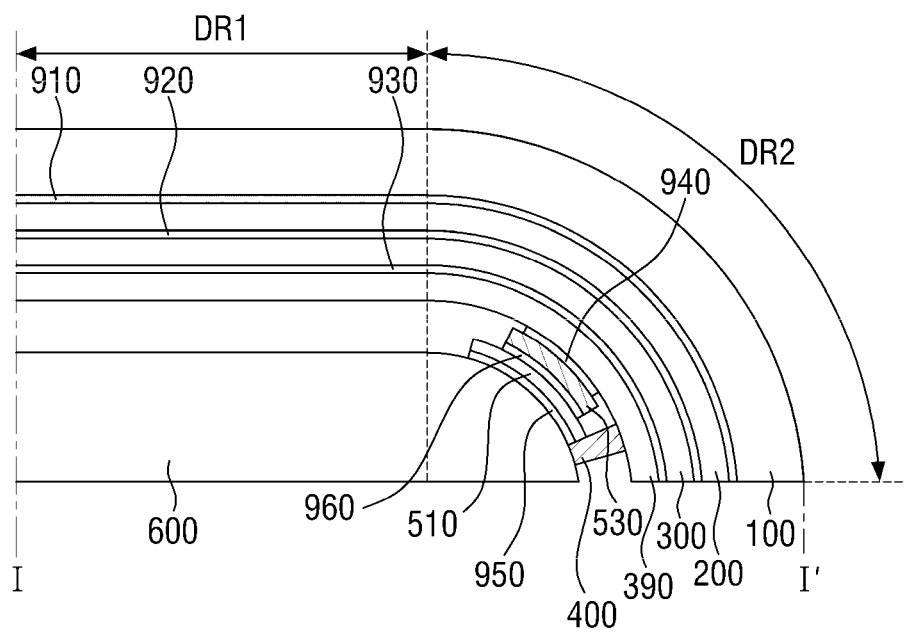
FIG. 11 is a cross-sectional view showing an exemplary embodiment, taken along line I-I' of FIGS. 3 and 4.

The cover window 100 may be disposed on the display panel 300 to cover the upper surface of the display panel 300. Thus, the cover window 100 can protect the upper surface of the display panel 300. The cover window 100 may be attached to the touch sensing device 200 through a first adhesive member 910 as shown in FIG. 11. The first adhesive member 910 may be an optically clear adhesive film (OCA) or an optically clear resin (OCR).

The cover window 100 may include a transmissive portion DA100 corresponding to the display panel 300 and a non-transmissive portion NDA100 corresponding to the other area than the display panel 300. The cover window 100 may be disposed in the first region DR1 and the second regions DR2. The transmissive portion DA100 may be disposed in a part of the first region DR1 and a part of each of the second regions DR2. The non-transmissive portion NDA100 may be opaque. Alternatively, the non-transmissive portion NDA100 may be formed as a decoration layer having a pattern that can be displayed to the user when no image is displayed. For example, the company's logo such as "SAMSUNG" or various letters may be patterned in the non-transmissive portion NDA100. Holes HH for exposing a front camera, a front speaker, an infrared sensor, an iris recognition sensor, an ultrasonic sensor, an illuminance sensor, etc. may be formed in the non-transmissive portion NDA100. For example, some or all of the front camera, the front speaker, the infrared sensor, the iris recognition sensor, the ultrasonic sensor and the illuminance sensor may be incorporated into the display panel 300, in which case some or all of the holes HH may be removed.

The cover window 100 may be made of glass, sapphire, and/or plastic. The cover window 100 may be rigid or flexible.

The touch sensing device 200 may be disposed between the cover window 100 and the display panel 300. The touch sensing device 200 may be disposed in the first region DR1 and the second regions DR2. Therefore, a user's touch can be sensed not only in the first region DR1 but also in the second regions DR2.

The touch sensing device 200 may be attached to the lower surface of the cover window 100 through the first adhesive member 910 as shown in FIG. 11. A polarizing film may be added on the touch sensing device 200 to avoid the visibility from decreasing due to reflection of external light. Then, the polarizing film may be attached to the lower surface of the cover window 100 through the first adhesive member 910.

The touch sensing device 200 is an element for sensing a user's touch position. The touch sensing device 200 may be implemented as a capacitive touch sensing device of a self-capacitance type or a mutual capacitance type. When the touch sensing device 200 is of a self-capacitance type, the touch sensing device 200 may include only the touch driving electrodes. On the other hand, when the touch sensing device 200 is of a mutual capacitance type, the touch sensing device 200 may include touch driving electrodes and touch sensing electrodes. In the following description, the mutual capacitive touch sensing device will be described as an example.

The touch sensing device 200 may be in the form of panel or film. The touch sensing device 200 may be attached to a thin encapsulation layer of the display panel 300 through the second adhesive member 920 as shown in FIG. 11. The second adhesive member 920 may be an optically clear adhesive film (OCA) or an optically clear resin (OCR).

Alternatively, the touch sensing device 200 may be formed integrally with the display panel 300. In this case, the touch driving electrodes and the touch sensing electrodes of the touch sensing device 200 may be formed on the thin-film encapsulation layer of the display panel 300.

Figure 3:
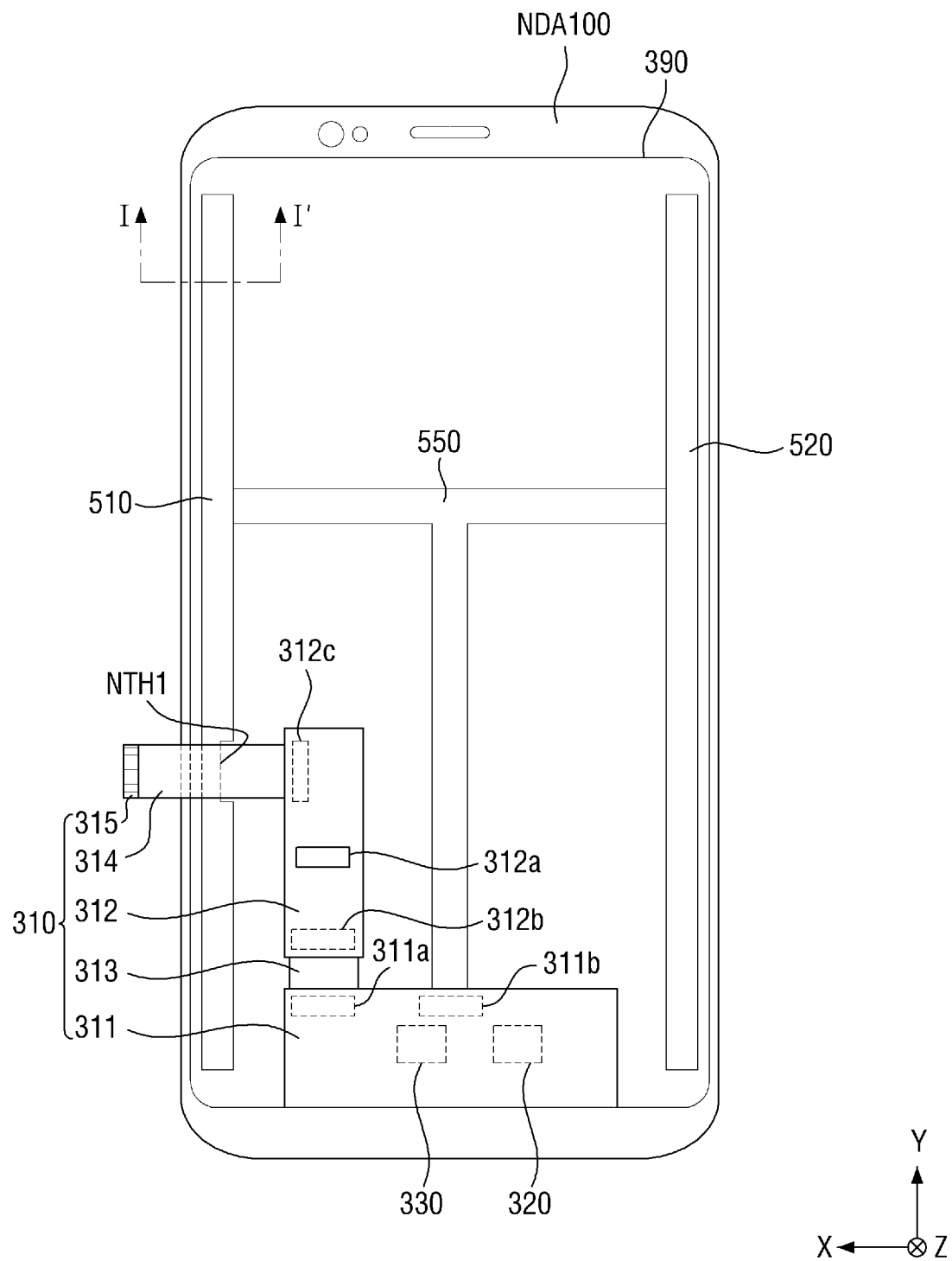
FIG. 3 is a bottom view of a display panel attached a cover window according to an exemplary embodiment.

A touch circuit board 210 may be attached to one side of the touch sensing device 200. Specifically, one side of the touch circuit board 210 may be attached to pads disposed on one side of the touch sensing device 200 using an anisotropic conductive film. In addition, a touch connection portion may be disposed on the other side of the touch circuit board 210. The touch connection portion may be connected to a touch connector of the display circuit board 310 as shown in FIG. 3. The touch circuit board may be a flexible printed circuit board.

The touch driver 220 may apply touch driving signals to the touch driving electrodes of the touch sensing device 200, may sense sensing signals from the touch sensing electrodes of the touch sensing device 200, and may calculate a user's touch position by analyzing the sensing signals. The touch driver 220 may be formed as an integrated circuit and mounted on the touch circuit board 210.

The display panel 300 may be disposed under the touch sensing device 200. The display panel 300 may overlap the transmissive portion 100DA of the cover window 100. The display panel 300 may be disposed in the first region DR1 and the second areas DR2. Therefore, the image on the display panel 300 can be seen not only in the first region DR1 but also in the second areas DR2.

The display panel 300 may be a light-emitting display panel including a light-emitting element. For example, the display panel 300 may include an organic light-emitting display panel using organic light-emitting diodes, a micro light-emitting diode display panel using micro LEDs, and a quantum-dot light-emitting display panel including quantum-dot light-emitting diodes.

The display panel 300 may include a substrate, a thin-film transistor layer disposed on the substrate, a light-emitting element layer, and a thin-film encapsulation layer.

Since the display panel 300 is flexible, it can be formed of plastic. Then, the substrate may include a flexible substrate and a support substrate. Because the support substrate supports the flexible substrate, it may be less flexible. Each of the flexible substrate and the support substrate may include a flexible polymer material. For example, each of the flexible substrate and the support substrate may be polyethersulphone (PES), polyacrylate (PA), polyacrylate (PAR), polyetherimide (PEI), polyethylenenapthalate (PEN), polyethyleneterepthalate (PET), polyphenylenesulfide (PPS), polyallylate, polyimide (PI), polycarbonate (PC), cellulosetriacetate (CAT), cellulose acetate propionate (CAP), or combinations thereof.

A thin film transistor layer is disposed on the substrate. The thin film transistor layer may include scan lines, data lines, and thin film transistors. Each of the thin film transistors includes a gate electrode, a semiconductor layer, and source and drain electrodes. When a scan driver is formed directly on the substrate, it may be formed together with the thin film transistor layer.

The light-emitting element layer is disposed on the thin film transistor layer. The light-emitting element layer includes anode electrodes, an emissive layer, a cathode electrode, and banks. The emissive layer may include an organic emissive layer containing an organic material. For example, the emissive layer may include a hole injection layer, a hole transporting layer, an organic light-emitting layer, an electron transporting layer, and an electron injection layer. The hole injection layer and the electron injection layer may be omitted. When a voltage is applied to the anode electrode and the cathode electrode, the holes and electrons move to the organic emissive layer through the hole transporting layer and the electron transporting layer, respectively, such that they combine internal organic emissive layer to emit light. The light-emitting element layer may be a pixel array layer where pixels are formed. Accordingly, the region where the light-emitting element layer is formed may be defined as a display area for displaying images. The peripheral area of the display area may be defined as a non-display area.

A thin encapsulation layer is disposed on the light-emitting element layer. The thin encapsulation layer serves to prevent or reduce permeation of oxygen or moisture into the light-emitting element layer. The thin encapsulation layer may include at least one inorganic layer and at least one organic layer.

The display circuit board 310 may be attached to one side of the display panel 300. Specifically, one side of the display circuit board 310 may be attached to pads disposed on one side of the display panel 300 using an anisotropic conductive film. The display circuit board 310 can be bent toward the lower surface of the display panel 300. The touch circuit board 210 may also be bent toward the lower surface of the display panel 300. Accordingly, the touch connection portion disposed at one end of the touch circuit board 210 may be connected to the touch connector 312a (see FIG. 3) of the display circuit board 310. The display circuit board 310 will be described in detail with reference to FIGS. 3 and 4.

The display driver 320 outputs signals and voltages for driving the display panel 300 through the display circuit board 310. The display driver 320 may be formed as an integrated circuit and mounted on the display circuit board 310, but is not limited thereto. For example, the display driver 320 may be directly mounted on the substrate of the display panel 300, specifically, on the upper surface or the lower surface of the substrate of the display panel 300.

A panel support member 390 may be disposed under the display panel 300 as shown in FIG. 11. The panel support member 390 may be attached to the lower surface of the display panel 300 through a third adhesive member 930 as shown in FIG. 11. The third adhesive member 930 may be an optically clear adhesive film (OCA) or an optically clear resin (OCR).

The panel support member 390 may include at least one of a light-absorbing member for absorbing light incident from outside, a buffer member for absorbing external impact, a heat dissipating member for efficiently discharging heat from the display panel 300, and a light-blocking layer for blocking light incident from outside.

The light absorbing member may be disposed under the display panel 300. The light-absorbing member blocks the transmission of light to prevent or reduce the elements disposed thereunder from being seen from above the display panel 300, such as the first force sensor 510, the second force sensor 520 and the display circuit board 310. The light-absorbing member may include a light-absorbing material such as a black pigment and a dye.

The buffer member may be disposed under the light-absorbing member. The buffer member absorbs an external impact to prevent the display panel 300 from being damaged or reduce the damage. The buffer member may be made up of a single layer or multiple layers. For example, the buffer member may be formed of a polymer resin such as polyurethane, polycarbonate, polypropylene and polyethylene, or may be formed of a material having elasticity such as a rubber and a sponge obtained by foaming a urethane-based material or an acrylic-based material. The buffer member may be a cushion layer.

The heat dissipating member may be disposed under the buffer member. The heat dissipation member may include a first heat dissipation layer including graphite or carbon nanotubes, and a second heat dissipation layer formed of a thin metal film such as copper, nickel, ferrite and silver, which can block electromagnetic waves and have high thermal conductivity.

The first force sensor 510 and the second force sensor 520 may be disposed in the second regions DR2, respectively. Specifically, the first force sensor 510 may be disposed under the display panel 300 at the right edge of the display panel 300. The second force sensor 520 may be disposed under the display panel 300 at the left edge of the display panel 300. As shown in FIGS. 1 and 2, the left and right sides of the display panel 300 are opposed to each other.

The first force sensor 510 and the second force sensor 520 may be attached to the lower surface of the panel support member 390. The first force sensor 510 and the second force sensor 520 may be connected to the display circuit board 310 via a force sensing circuit board 550. Although FIG. 3 shows that the first force sensor 510 and the second force sensor 520 are connected to the single force sensing circuit board 550, the present disclosure is not limited thereto. The first force sensor 510 and the second force sensor 520 may be connected to the display circuit board 310 via different force sensing circuit boards.

As shown in FIG. 3, a force sensing unit 330 for sensing a force by driving the first force sensor 510 and the second force sensor 520 may be mounted on the display circuit board 310. The force sensing unit 330 may be implemented as an integrated circuit. The force sensing unit 330 may be integrated with the display driver 320 to form a single integrated circuit.

Alternatively, the force sensing circuit board 550 may be connected to the touch circuit board 210 rather than the display circuit board 310. Then, the force sensing unit 330 may be mounted on the touch circuit board 210. The force sensing unit 330 may be integrated with the touch driver 220 to form a single integrated circuit.

The frame 600, illustrated in FIG. 4, may be disposed below the panel support member 390. The frame 600 may include a synthetic resin, a metal, or both a synthetic resin and a metal.

The waterproof member 400 may be disposed along the edges of the frame 600. The waterproof member 400 may be disposed on the outer side of each of the first force sensor 510 and the second force sensor 520. The waterproof member 400 may be attached to the upper surface of the panel support member 390 and the lower surface of the frame 600.

According to the exemplary embodiment shown in FIGS. 1 and 2, the waterproof member 400 is disposed on the outer side of the first force sensor 510 and on the outer side of the second force sensor 520, so that it is possible to prevent or reduce moisture or dust from permeating between the display panel 300 and the frame 600 by the waterproof member 400. That is to say, the display device 10 with waterproof and dustproof capabilities can be produced.

In the frame 600, a first camera hole CMH1 for inserting a camera device 720, a battery hole BH for dissipating the heat from a battery, and a cable hole CAH through which a second connection cable 314 connected to the display circuit board 310 passes. Specifically, the cable hole CAH may be disposed adjacent to the right edge of the frame 600 and may be covered by the first force sensor 510 disposed under the panel support member 390 at the right edge of the display panel 300. Accordingly, the first force sensor 510 may include a first recess NTH1 in the form of a notch on a side thereof for exposing the cable hole CAH, as shown in FIG. 2.

In addition, the frame 600 is disposed under the panel support member 390 of the display panel 300, the first force sensor 510, and the second force sensor 520. The frame 600 can support the first force sensor 510 and the second force sensor 520 when a pressure is applied to the first force sensor 510 and the second force sensor 520. Accordingly, the first force sensor 510 and the second force sensor 520 can sense the applied force.

The main circuit board 700 may be disposed under the frame 600. The main circuit board 700 may be either a printed circuit board or a flexible printed circuit board.

The main circuit board 700 may include a main processor 710, a camera device 720, and a main connector 730. The main processor 710 and the main connector 730 may be disposed on the lower surface of the main circuit board 700 facing the bottom cover 900. In addition, the camera device 720 may be disposed on both upper and lower surfaces of the main circuit board 700.

The main processor 710 may control all the functions of the display device 10. For example, the main processor 710 may output image data to the display driver 320 of the display circuit board 310 so that the display panel 300 displays an image. In addition, the main processor 710 may receive touch data from the touch driver 220 to determine the position of the user's touch, and then may execute an application indicated by the icon displayed at the position of the user's touch. In addition, the main processor 710 may receive force sensing data from the touch driver 220 or the force sensing unit 330 to run an application indicated by an icon at the position of the user's force according to the force sensing data. In addition, the main processor 710 may cause the vibration generator 901 to vibrate according to the force sensing data to provide a haptic feedback. The main processor 710 may be an application processor, a central processing unit, or a system chip implemented as an integrated circuit.

The camera device 720 processes image frames such as still image and video obtained by the image sensor in the camera mode and outputs them to the main processor 710.

The second connection cable 314 passing through the connector hole CAH of the frame 600 may be connected via connecting portion 315 to the main connector 730 disposed on the lower surface of the main circuit board 700 via a gap between the middle frame 600 and the main circuit board 700. Accordingly, the main circuit board 700 may be electrically connected to the display circuit board 310 and the touch circuit board 210.

Besides, a mobile communications module capable of transmitting/receiving a radio signal to/from at least one of a base station, an external terminal and a server over a mobile communications network may be further mounted on the main circuit board 700. The wireless signal may include various types of data depending on a voice signal, a video call signal, or a text/multimedia message transmission/reception. In addition, the main circuit board 700 may further include an audio output device capable of outputting sound such as a speaker.

The bottom cover 900 may be disposed below the frame 600 and the main circuit board 700. The bottom cover 900 may be fastened and fixed to the frame 600. The bottom cover 900 may form the exterior of the lower surface of the display device 10. The bottom cover 900 may include plastic and/or metal.

A second camera hole CMH2 may be formed in the bottom cover 900 via which the camera device 720 is inserted to protrude to the outside. The positions of the camera device 720 and the first and second camera holes CMH1 and CMH2 in line with the camera device 720 are not limited to those of the exemplary embodiment shown in FIGS. 1, 2, 4 and 5.

In addition, the vibration generator 901 may be disposed on the upper surface of the bottom cover 900, and the vibration generator 901 may be connected to the lower surface of the main circuit board 700. Accordingly, the vibration generator 901 can generate vibration in response to a vibration signal from the main processor 710. The vibration generator 901 may be one of an eccentric rotating mass (ERM), a linear resonant actuator (LRA) and a piezo actuator.

FIG. 3 is a bottom view showing an exemplary embodiment of a display panel according to an exemplary embodiment. FIG. 4 is a plan view showing an exemplary embodiment of a frame according to an exemplary embodiment. FIG. 5 is a bottom view of a frame and a main circuit board according to an exemplary embodiment.

Hereinafter, referring to FIGS. 3 to 5, the connection between the display circuit board 310 and the third circuit board 550 and the connection between the second connection cable 314 and the main connector 730 of the main circuit board 700 will be described in detail. It is to be noted that FIG. 4 is a plan view while FIGS. 3 and 5 are bottom views and thus the left and right of the display device 10 in FIG. 4 are reversed in FIGS. 3 and 5. For convenience of illustration, the display circuit board 310 is depicted with a dashed line in FIG. 4, and the second connection cable 314 is depicted in an alternate view portion of FIG. 5 provided in a circle with a dot-dash line.

Figure 4:
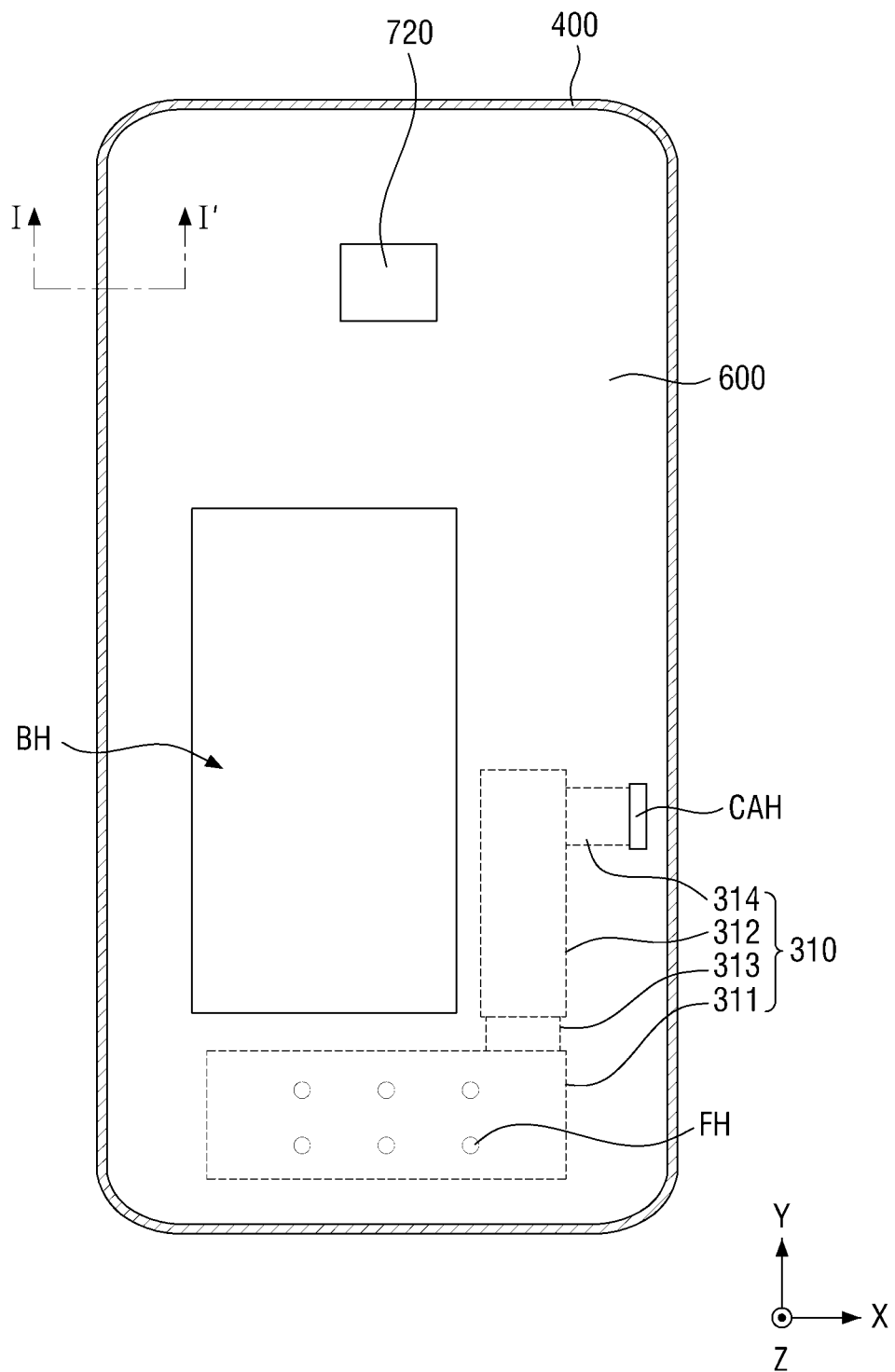
FIG. 4 is a plan view showing a frame according to an exemplary embodiment.
Figure 5:
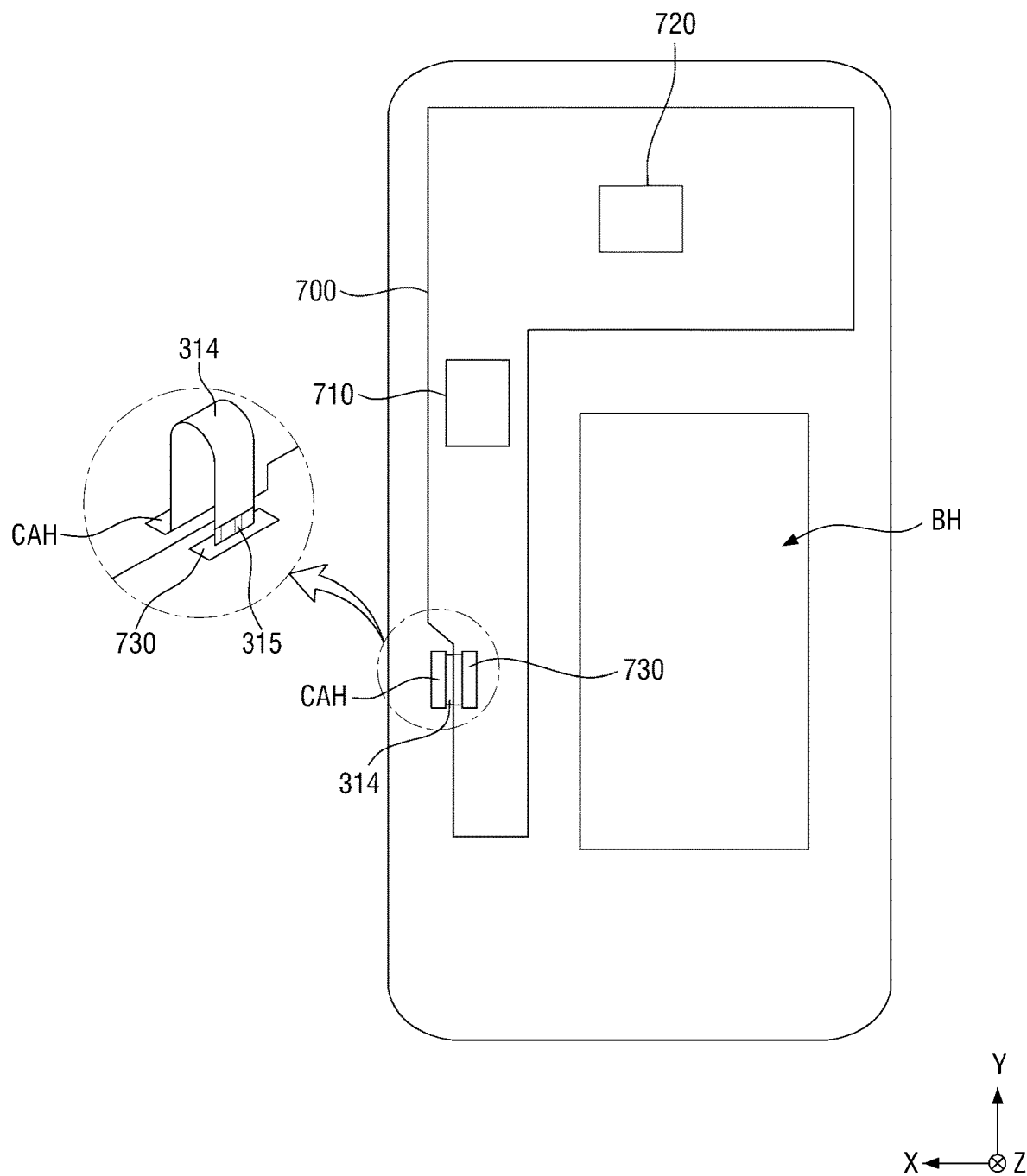
FIG. 5 is a bottom view of a frame and a main circuit board according to an exemplary embodiment.

Referring to FIGS. 3 to 5, the display circuit board 310 may include a first circuit board 311, a second circuit board 312 and a first connection cable 313.

The first circuit board 311 may be attached to one side of the upper surface or the lower surface of the substrate of the display panel 300 and may be bent toward the lower surface of the substrate of the display panel 300. The first circuit board 311 may be fixed in the fixing holes FH formed in the frame 600 by fixing members as shown in FIG. 4.

The first circuit board 311 may include a display driver 320, a force sensing unit 330, a first connector 311a, and a second connector 311b. The display driver 320, the force sensing unit 330, the first connector 311a and the second connector 311b may be disposed on the surface of the first circuit board 311.

The first connector 311a may be connected to one end of the first connection cable 313 connected to the second circuit board 312. The display driver 320 and the force sensing unit 330 mounted on the first circuit board 311 may be electrically connected to the second circuit board 312 via the first connection cable 313.

The second connector 311b may be connected to one end of the third circuit board 550 connected to the first force sensor 510 and the second force sensor 520. Accordingly, the first force sensor 510 and the second force sensor 520 may be electrically connected to the force sensing unit 330.

The second circuit board 312 may include a touch connector 312a, a first connector 312b, and a second connector 312c. The first connector 312b and the second connector 312c may be disposed on one surface of the second circuit board 312, and the touch connector 312a may be disposed on the other surface of the second circuit board 312.

The touch connector 312a may be connected to a touch connection portion disposed on one end of the touch circuit board 210. Accordingly, the touch driver 220 may be electrically connected to the second circuit board 312.

The first connector 312b may be connected to the other end of the first connection cable 313 connected to the first circuit board 311. The display driver 320 and the force sensing unit 330 mounted on the first circuit board 311 may be electrically connected to the second circuit board 312 via the first connection cable 313.

The second connector 312c may be connected to one end of a second connection cable 314 connected to the main connector 730 of the main circuit board 700. Thus, the second circuit board 312 may be electrically connected to the second circuit board 312 through the second connection cable 314.

A connecting portion 315 may be formed at the other end of the second connection cable 314. The connecting portion 315 of the second connection cable 314 may be extended below the frame 600 through the cable hole CAH of the frame 600 as shown in FIGS. 3 and 4. Since the first recess NTH1 in the form of a notch is formed on the inner side of the first force sensor 510 in line with the cable hole CAH of the middle frame 600, the cable hole CAH of the frame 600 can be exposed without being covered by the first force sensor 510.

Since there is a gap between the frame 600 and the main circuit board 700 as shown in FIG. 5, the connecting portion 315 of the second connection cable 314 passes through the cable hole CAH and then comes out of the gap between the frame 600 and the main circuit board 700 to be extended below the main circuit board 700. Ultimately, the connector connecting portion 315 of the second connection cable 314 may be connected to the main connector 730 disposed on the lower surface of the main circuit board 700.

According to the exemplary embodiment shown in FIGS. 3 to 5, the first recess NTH in the form of a notch is formed on one side of the first force sensor 510 so as not to cover the cable hole CAH of the frame 600. Accordingly, the second connection cable 314 connected to the display circuit board 310 may be extended below the frame 600 through the cable hole CAH and may be connected to the main connector 730 of the main circuit board 700. Therefore, the display circuit board 310 can be connected to the main circuit board 700 stably.

Figure 6:
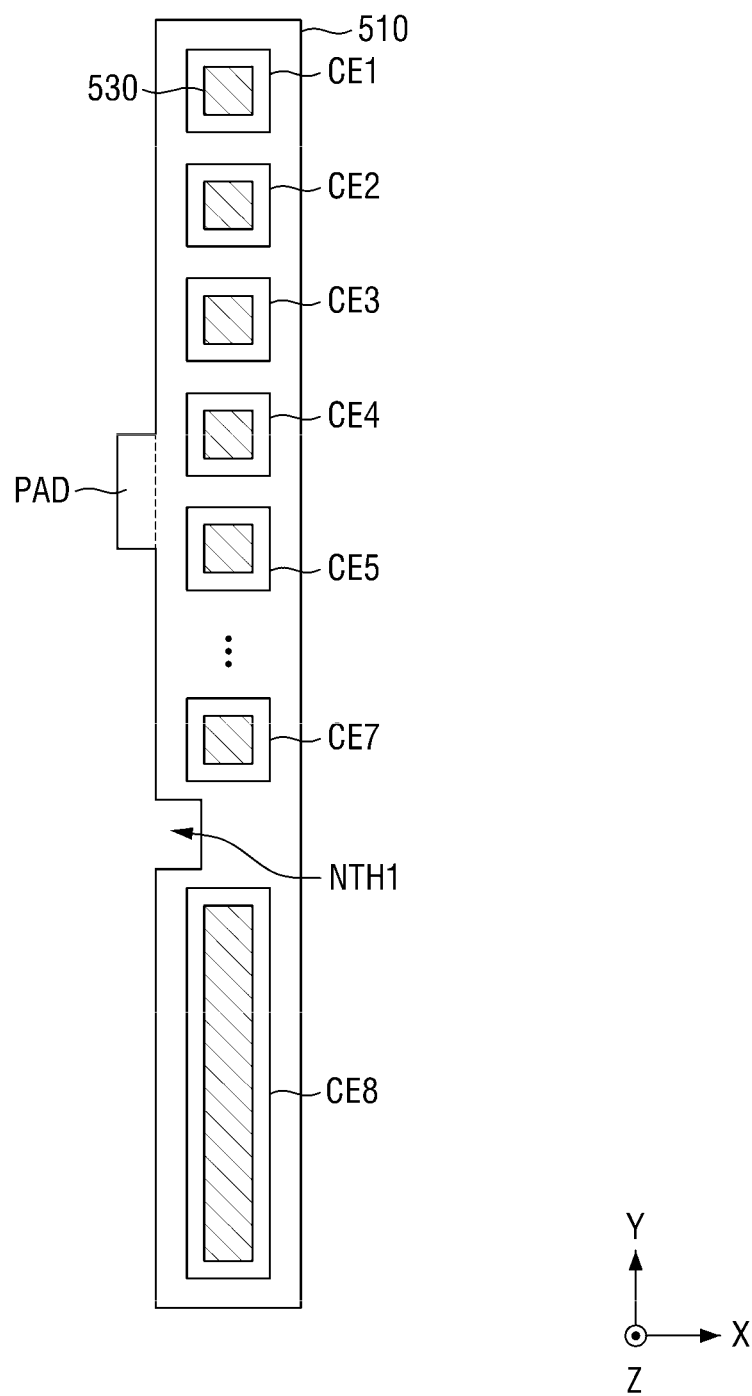
FIG. 6 is a plan view showing a first force sensor and first bumps according to an exemplary embodiment.

FIG. 6 is a plan view showing a first force sensor and first bumps according to an exemplary embodiment.

Referring to FIG. 6, the first force sensor 510 may have a rectangular shape having shorter sides in a first direction (x-axis direction) and longer sides in a second direction (y-axis direction) when viewed from the top. It is, however, to be understood that the present disclosure is not limited thereto. The shape of the first force sensor 510 may vary depending on where it is disposed.

The first force sensor 510 includes a plurality of force sensitive cells CE1 to CE8 and a pad area PAD. Although the first force sensor 510 shown in FIG. 6 includes eight force sensitive cells CE1, CE2, CE3, CE4, CE5, CE6, CE7, and CE8, the number of the force sensitive cells CE1 to CE8 is not limited to eight.

Each of the force sensitive cells CE1 to CE8 may individually sense the force at the respective positions. Although the force sensitive cells CE1 to CE8 shown in FIG. 6 are arranged in a single row, the present disclosure is not limited thereto. The force sensitive cells CE1 to CE8 may be arranged in several rows as desired. In addition, the force sensitive cells CE1 to CE8 may be arranged at predetermined intervals as shown in FIG. 6 or may be arranged continuously.

Figure 10B:
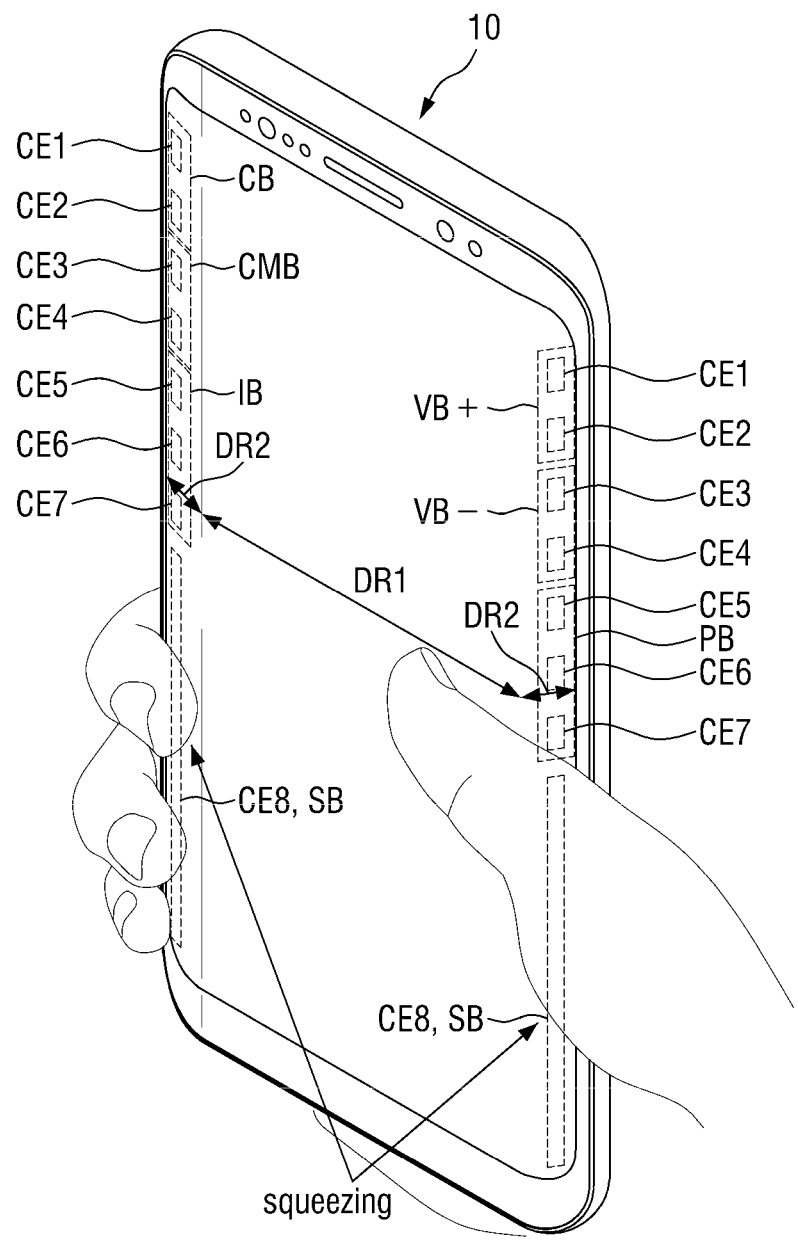

The force sensitive cells CE1 to CE8 may have different areas depending on the use. For example, as shown in FIG. 10A, the first to seventh force sensitive cells CE1 to CE7 may be used as physical buttons such as volume control buttons VB+ and VB− and a power button PB disposed on the edge of a side of the display device 10. Alternatively, as shown in FIG. 10B, the eighth force sensitive cell CE8 may be used as a button SB for sensing a user's squeezing pressure. The eighth force sensitive cell CE8 may be formed to have a larger area than the first to seventh force sensitive cells CE1 to CE7. The eighth force sensitive cell CE8 may be longer than the first to seventh force sensitive cells CE1 to CE7 in the longitudinal direction (y-axis direction) of the first force sensor 510.

Additionally, although the first to seventh force sensitive cells CE1 to CE7 used as physical buttons have the same area in FIG. 6, the present disclosure is not limited thereto. That is to say, the first to seventh force sensitive cells CE1 to CE7 may have different areas from one another. Alternatively, some of the first to seventh force sensitive cells CE1 to CE7 may have the same area while the others may have the same area, which is different from the area of the some of the force sensitive cells.

First bumps 530 may be disposed on the first to eighth force sensitive cells CE1 to CE8, respectively, such that they overlap with the first to eighth force sensitive cells CE1 to CE8, respectively. The first bumps 530 are used to press the first to eighth force sensitive cells CE1 to CE8 when a user's pressure is applied. Accordingly, the user's force may be sensed by the first to eighth force sensitive cells CE1 to CE8.

In order to increase the force applied to the first to eighth force sensitive cells CE1 to CE8 by the first bumps 530, each of the first bumps 530 may be formed to have an area smaller than that of the respective one of the first to eighth force sensitive cells CE1 to CE8. Each of the first bumps 530 may be smaller than the force sensing layer PSL (see FIG. 9A) of the respective one of the first to eighth force sensitive cells CE1 to CE8.

The area of each of the first bumps 530 may be proportional to the area of the respective force sensitive cells. For example, as shown in FIG. 6, when the area of the eighth force sensitive cell CE8 is larger than the area of each of the first to seventh force sensitive cells CE1 to CE7, the area of the first bump 530 on the eighth force sensitive cell CE8 may be larger than the area of the each of the first bumps 530 on the first to seventh force sensitive cells CE1 to CE7.

In addition, in order not to cover the cable hole CAH of the frame 600, the first recess NTH1 in the form of a notch may be formed at the portion of the first force sensor 510 that is in line with the cable hole CAH of the frame 600.

Figure 7:
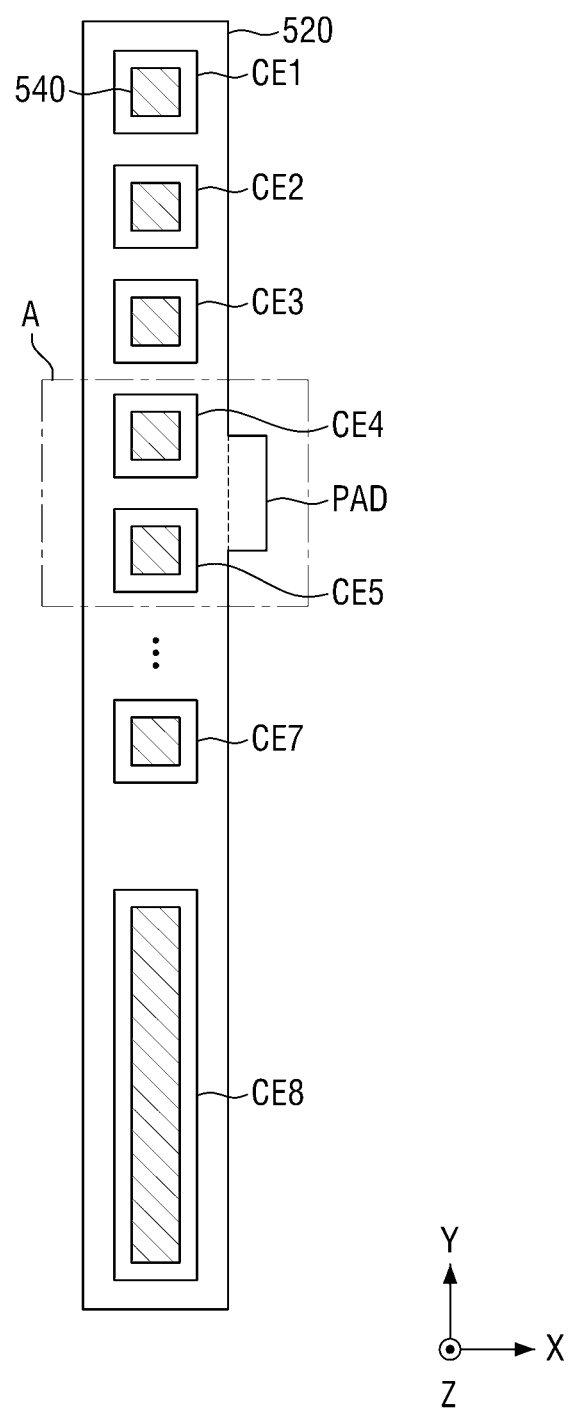
FIG. 7 is a plan view showing a second force sensor and second bumps according to an exemplary embodiment.

It is to be noted that the second force sensor 520 and the second bumps 540 shown in FIG. 7 are identical to the first force sensor 510 and the first bumps 530 shown in FIG. 6, respectively, except that the second force sensor 520 does not include the first recess NTH1. Accordingly, the second force sensor 520 and the second bumps 540 shown in FIG. 7 will not be described in detail.

Figure 8:
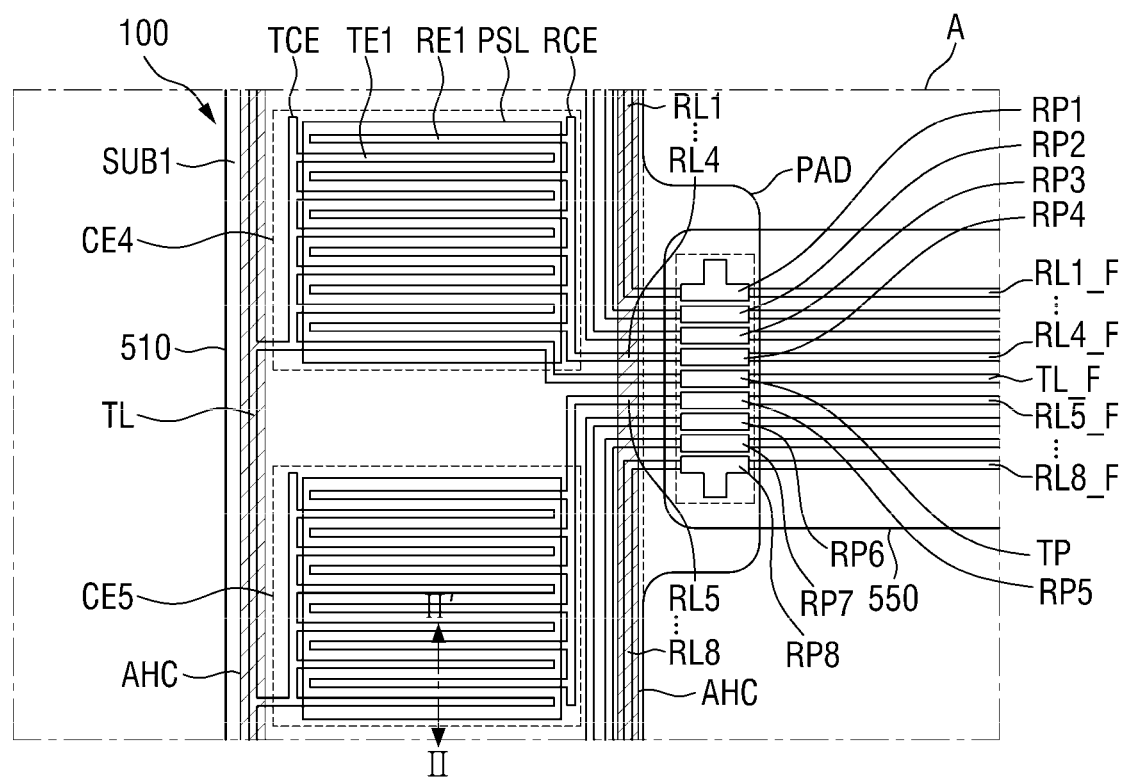
FIG. 8 is a plan view of area A shown in FIG. 7.
Figure 8:
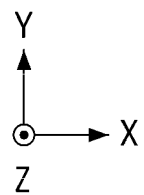
Figure 9A:
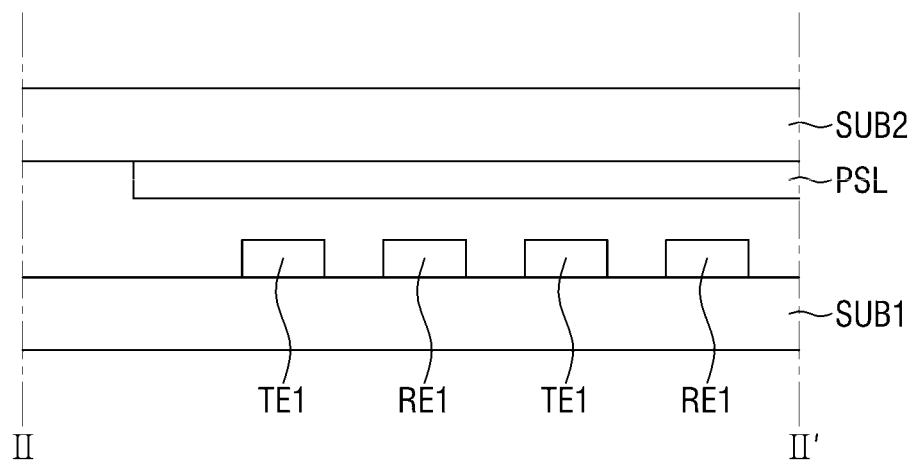
FIG. 9A is a cross-sectional view showing an exemplary embodiment, taken along line II-II' of FIG. 8.

FIG. 8 is a plan view of area A shown in FIG. 7. FIG. 9A is a cross-sectional view showing an exemplary embodiment, taken along line III-III' of FIG. 8.

Referring to FIGS. 8 and 9A, the first force sensor 510 includes a first substrate SUB1, a second substrate SUB2, a driving line TL, first to eighth sensing lines RL1 to RL8, a driving pad TP, first to eighth sensing pads RP1 to RP8, and first to eighth force sensitive cells CE1 to CE8.

FIG. 8 shows only the fourth force sensitive cell CE4, the fifth force sensitive cell CE5 and the pad area PAD for convenience of illustration. In FIG. 8, the second substrate SUB2 is not shown for convenience of illustration.

As illustrated in FIG. 9A, the first substrate SUB1 faces the second substrate SUB2. Each of the first substrate SUB1 and the second substrate SUB2 may include a material such as polyethylene, polyimide, polycarbonate, polysulfone, polyacrylate, polystyrene, polyvinyl chloride, polyvinyl alcohol, poly(norbornene), and poly ester. According to an exemplary embodiment, each of the first substrate SUB1 and the second substrate SUB2 may be formed as a polyethylene terephthalate (PET) film or a polyimide film.

The force sensitive cells CE1 to CE8 are disposed between the first substrate SUB1 and the second substrate SUB2. The driving line TL, the sensing lines RL1 to RL8, the driving pad TP and the sensing pads RP1 to RP8 are disposed on one surface of the first substrate SUB1 facing the second substrate SUB2. The force sensitive cells CE1 to CE8 are disposed between the first substrate SUB1 and the second substrate SUB2.

Each of the force sensitive cells CE1 to CE8 may be connected to at least one driving line and at least one sensing line. For example, while the force sensitive cells CE1 to CE8 are commonly connected to the single driving line TL, they may be connected to the sensing lines RL1 to RL8, respectively. As shown in FIG. 8, the fourth force sensitive cell CE4 may be connected to the driving line TL and the fourth sensing line RL4, while the fifth force sensitive cell CE5 may be connected to the driving line TL and the fifth sensing line RL5.

The driving line TL may be connected to the driving pad TP, and the sensing lines RL1 to RL8 may be connected to the sensing pads RP1 to RP8, respectively. The first sensing line RL1 may be connected to the first sensing pad RP1, the second sensing line RL2 may be connected to the second sensing pad RP2, the third sensing line RL3 may be connected to the third sensing pad RP3 and the fourth sensing line RL4 may be connected to the fourth sensing pad RP4. The fifth sensing line RL5 may be connected to the fifth sensing pad RP5, the sixth sensing line RL6 may be connected to the sixth sensing pad RP6, the seventh sensing line RL7 may be connected to the seventh sensing pad RP7, and the eighth sensing line RL8 may be connected to the eighth sensing pad RP8.

The pad area PAD may protrude from one side of the first substrate SUB1. The side of the first substrate SUB1 may be the longer side of the first force sensor 510. Although the pad area PAD protrudes from the center of the longer side of the first substrate SUB1 in FIG. 8, the present disclosure is not limited thereto. That is to say, the pad area PAD may protrude from one end or the other end of the longer side of the first substrate SUB1.

The driving pad TP and the sensing pads RP1 to RP8 may be disposed in the pad area PAD. The driving pad TP and the sensing pads RP1 to RP8 may be connected to a driving lead line TL_F and sensing lead lines RL1_F to RL8_F of the third circuit board 550, respectively, through an anisotropic conductive film. The driving pad TP may be connected to the driving lead line TL_F, the first sensing pad RP1 may be connected to a first sensing lead line RL1_F, the second sensing pad RP2 may be connected to a second sensing lead line RL2_F, the third sensing pad RP3 may be connected to a third sensing lead line RL3_F, and the fourth sensing pad RP4 may be connected to a fourth sensing lead line RL4_F. In addition, the fifth sensing pad RP5 may be connected to the fifth sensing lead line RP5_F, the sixth sensing pad RP6 may be connected to the sixth sensing lead line RP6_F, the seventh sensing pad RP7 may be connected to the seventh sensing lead line RP7_F, and the eighth sensing pad RP8 may be connected to the eighth sensing lead line RP8_F.

As shown in FIG. 8, the third circuit board 550 is connected to the display circuit board 310 so that the third circuit board 550 may be electrically connected to the force sensing unit 330 mounted on the display circuit board 310, as shown in FIG. 3. The force sensing unit 330 applies a driving voltage to the driving line TL through the driving lead line TL_F of the third circuit board 550 and the driving pad TP of the first force sensor 510, and senses the current values or voltage values from the sensing lines RL1 to RL8 through the sensing lead lines RL1_F to RL8_F connected to the sensing pads RP1 to RP8 of the first force sensor 510, to thereby sense the pressure applied to the force sensitive cells CE1 to CE8.

The first force sensor 510 may further include a coupling layer AHC disposed between the first substrate SUB1 and the second substrate SUB2 to couple them together. The coupling layer AHC may be implemented as a pressure-sensitive adhesive layer or an adhesive layer. The coupling layer AHC may be disposed along the periphery of the first substrate SUB1 and the second substrate SUB2. In an exemplary embodiment, the coupling layer AHC may completely surround the edges of the first substrate SUB1 and the second substrate SUB2 to seal the inside of the first force sensor 510. In addition, the coupling layer AHC may serve as a spacer for maintaining the distance between the first substrate SUB1 and the second substrate SUB2. In FIG. 8, the coupling layer AHC is not formed in the pad area PAD. Accordingly, no coupling layer overlaps with the driving line TL, the sensing lines RL1 to RL8, the force sensitive cells CE1 to CE8, the driving pad TP and the sensing pads RP1 to RP8. It is, however, to be understood that the present disclosure is not limited thereto. For example, the coupling layer AHC may be disposed such that it overlaps with the driving line TL, the sensing lines RL1 to RL8, the force sensitive cells CE1 to CE8, the driving pad TP and the sensing pads RP1 to RP8.

The coupling layer AHC may be first attached to one surface of one of the first substrate SUB1 and the second substrate SUB2 and then attached to one surface of the other substrate during the process of attaching the first substrate SUB1 and the second substrate SUB2 together. As another exemplary embodiment, a coupling layer AHC may be disposed on each of one surface of the first substrate SUB1 and one surface of the second substrate SUB2, and then the coupling layer AHC on the first substrate SUB1 may be attached to the coupling layer AHC on the second substrate SUB2 during the process of attaching the first substrate SUB1 and the second substrate SUB2 together.

As shown in FIG. 8 and FIG. 9A, each of the force sensitive cells CE1 to CE8 includes a driving connection electrode TCE, a sensing connection electrode RCE, driving electrodes TE1, sensing electrodes RE1, and a force sensing layer PSL.

The driving connection electrode TCE, the sensing connection electrode RCE, the driving electrodes TE1 and the sensing electrodes RE1 are disposed on the first substrate SUB1 facing the second substrate SUB2.

The driving connection electrode TCE is connected to the driving line TL and the driving electrode TE1. Specifically, the driving connection electrode TCE is connected to the driving line TL at one end in the longitudinal direction (y-axis direction). The driving electrodes TE1 may branch off in the width direction (x-axis direction) of the driving connection electrode TCE.

The sensing connection electrode RCE is connected to one of the sensing lines RL1 to RL8 and the sensing electrodes RE1. Specifically, the sensing connection electrode TCE is connected to one of the sensing lines RL1 to RL8 at one end in the longitudinal direction (y-axis direction). The sensing electrodes RE1 may branch off in the width direction (x-axis direction) of the sensing connection electrode RCE.

The driving electrodes TE1 and the sensing electrodes RE1 may be disposed on the same layer. The driving electrodes TE1 and the sensing electrodes RE1 may be made of the same material. For example, the driving electrodes TE1 and the sensing electrodes RE1 may include a conductive material such as silver (Ag) and copper (Cu). The driving electrodes TE1 and the sensing electrodes RE1 may be formed on the first substrate SUB1 by screen printing.

The driving electrodes TE1 and the sensing electrodes RE1 are disposed adjacent to each other but are not connected to each other. The driving electrodes TE1 and the sensing electrodes RE1 may be arranged in parallel with one another. The driving electrodes TE1 and the sensing electrodes RE1 may be alternately arranged in the longitudinal direction (y-axis direction) of the driving connection electrode TCE and the sensing connection electrode RCE. That is to say, the driving electrode TE1, the sensing electrode RE1, the driving electrode TE1 and the sensing electrode RE1 may be arranged repeatedly in this order in the longitudinal direction (y-axis direction) of the driving connection electrode TCE and the sensing connection electrode RCE.

The force sensing layer PSL is disposed on the surface of the second substrate SUB2 facing the first substrate SUB1. The force sensing layer PSL may be disposed such that it overlaps with the driving electrodes TE1 and the sensing electrodes RE1 in plan view.

The force sensing layer PSL may include a force sensitive material and a polymer resin where the force sensitive material is disposed. The force sensitive material may be metal microparticles (or metal nanoparticles) such as nickel, aluminum, titanium, tin and copper. For example, the force sensing layer PSL may be a quantum tunneling composite (QTC).

When no force in the height direction (z-axis direction) of the first force sensor 510 is applied to the second substrate SUB2, there is a gap between the force sensing layer PSL and the driving electrode TE1 and between the force sensing layer PSL and the sensing electrodes RE1 as shown in FIG. 9A. That is to say, when no force is applied to the second substrate SUB2, the force sensing layer PSL is spaced apart from the driving electrodes TE1 and the sensing electrodes RE1.

When a force is applied to the second substrate SUB2 in the height direction (z-axis direction) of the first force sensor 510, the force sensing layer PSL may come in contact with the driving electrodes TE1 and the sensing electrodes RE1. In this case, at least one of the driving electrodes TE1 and at least one of the sensing electrodes RE1 may be physically connected with one another through the force sensing layer PSL, and the force sensing layer PSL may work as an electrical resistance.

Figure 9B:
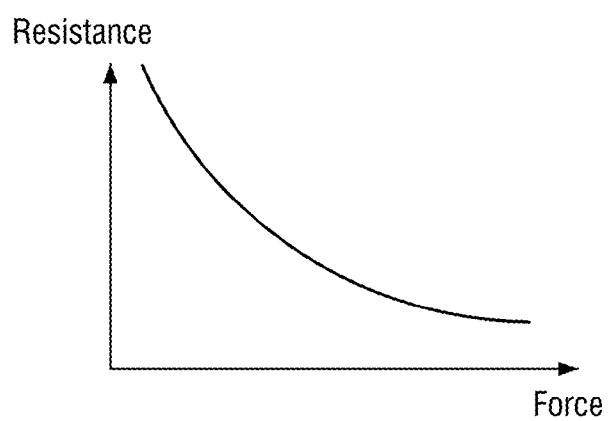
FIG. 9B is a graph illustrating the electrical resistance verses force on a force sensing layer.

According to the exemplary embodiment shown in FIGS. 8 and 9A, the area in which the force sensing layer PSL comes in contact with the driving electrodes TE1 and with the sensing electrodes RE1 varies depending on the force applied to the first force sensor 510, such that the resistance value of the sensing line electrically connected to the sensing electrodes RE1 may be changed. For example, as shown in FIG. 9B, the higher the force applied to the force sensitive cells of the first force sensor 510 is, the lower the resistance value of the sensing line is. The force sensing unit 330 senses a change in current value or a voltage value from the sensing lines RL1 to RL8, thereby sensing the force that the user presses by a finger.

The second force sensor 520 is substantially identical to the first force sensor 510 shown in FIGS. 8 and 9A; and, therefore, the redundant description will be omitted.

FIGS. 10A and 10B are views for illustrating display devices employing the first and second force sensors as physical buttons according to an exemplary embodiment.

FIGS. 10A and 10B show the first to eighth force sensitive cells CE1 to CE8 of each of the first force sensor 510 and the second force sensor 520 disposed in the second regions DR2 of the display device 10, respectively. A first vibration generator may be disposed adjacent to the first to fourth force sensitive cells CE1, CE2, CE3 and CE4 of the first force sensor 510 disposed on the right curved portion of the display device 10. A third vibration generator may be disposed adjacent to the fifth to eighth force sensitive cells CE5, CE6, CE7 and CE8. In addition, a second vibration generator may be disposed adjacent to the first to fourth force sensitive cells CE1, CE2, CE3 and CE4 of the second force sensor 520 disposed on the left curved portion of the display device 10. A fourth vibration generator may be disposed adjacent to the fifth to eighth force sensitive cells CE5, CE6, CE7 and CE8.

FIG. 10A shows that a user grasps the display device 10 by hand and presses the fifth force sensitive cell CE5 on the left curved portion corresponding to the second region DR2 of the display device 10 with the index finger. FIG. 10B shows that a user grasps the display device 10 by hand and squeezes the eighth force sensitive cell CE8 on the left curved portion corresponding to the second region DR2 of the display device 10 with the middle finger, the ring finger and the little finger while squeezing the eighth force sensitive cell CE8 on the right curved portion corresponding to the second region DR2 of the display device 10 with the palm of the hand.

Referring to FIGS. 10A and 10B, the first force sensor 510 and the second force sensor 520 may be utilized on behalf of physical buttons for the display device 10. Specifically, when a force is applied to the first to eighth force sensitive cells CE1 to CE8 of the first force sensor 510 on the right curved portion of the display device 10 and to the first to eighth force sensitive cells CE1 to CE8 of the second force sensor 520 on the left curved portion of the display device 10, a predetermined application or operation can be performed.

For example, among the first to eighth force sensitive cells CE1 to CE8 of the first force sensor 510 on the right curved portion of the display device 10, the first force sensitive cell CE1 and the second force sensitive cell CE2 may be utilized as volume-up buttons VB+ which the user presses to turn up the volume of the display device 10. The third force sensitive cell CE3 and the fourth force sensitive cell CE4 may be utilized as volume-down buttons VB− which the user presses to turn down the volume of the display device 10. The fifth force sensitive cell CE5, the sixth force sensitive cell CE6 and the seventh force sensitive cell CE7 may be utilized as power buttons PB which the user presses to turn off the power.

When a force is sensed from the first force sensitive cell CE1 and the second force sensitive cell CE2 on the right curved portion of the display device 10, the main processor 710 may control the speaker of the display device 10 so that the volume is turned up. In addition, when a force is sensed from the third force sensitive cell CE3 and the fourth force sensitive cell CE4 on the right curved portion of the display device 10, the main processor 710 may control the speaker of the display device 10 so that the volume is turned up. In addition, when a force is sensed from the fifth force sensitive cell CE5 and the sixth force sensitive cell CE6 and the seventh force sensitive cell CE7 on the right curved portion of the display device 10, the main processor 710 may control the display device 10 so that the screen is turned off or the screen on which a user can select the power off may be output.

In addition, among the first to eighth force sensitive cells CE1 to CE8 on the left curved portion of the display device 10, the first force sensitive cell CE1 and the second force sensitive cell CE2 may be utilized as a call button CB which the user presses to run a phone application. The third force sensitive cell CE3 and the fourth force sensitive cell CE4 may be utilized as a camera button CMB which the user presses to run a camera application. The fifth force sensitive cell CE5, the sixth force sensitive cell CE6 and the seventh force sensitive cell CE7 may be utilized as an Internet button IB which the user presses to run an Internet application.

When a force is sensed from the first force sensitive cell CE1 and the second force sensitive cell CE2 on the left curved portion of the display device 10, the main processor 710 may control the display device 10 so that a phone application is run. In addition, when a force is sensed from the third force sensitive cell CE3 and the fourth force sensitive cell CE4 on the right curved portion of the display device 10, the main processor 710 may control the display device 10 so that a camera application is run. When a force is sensed from the fifth force sensitive cell CE5, the sixth force sensitive cell CE6 and the seventh force sensitive cell CE7 on the left curved portion of the display device 10, the main processor 710 may control the display device 10 so that an Internet application is run.

It is to be understood that the exemplary embodiment shown in FIG. 10A is merely one example, and thus the present disclosure is not limited thereto. That is to say, in response to a force applied to the first to seventh force sensitive cells CE1 to CE7 of the first force sensor 510 on the right curved portion of the display device 10 and the first to seventh force sensitive cells CE1 to CE7 of the second force sensor 520 on the left curved portion of the display device 10, various functions including or excluding the above-described functions may be run. Additionally, the main processor 710 may be programmed so that different operations are run when a force is applied to each of the first to seventh force sensitive cells CE1 to CE7 of the first force sensor 510 on the right curved portion of the display device 10 and each of the first to seventh force sensitive cells CE1 to CE7 of the second force sensor 520 on the left curved portion of the display device 10.

The eighth force sensitive cell CE8 on each of the left curved portion and the right curved portion of the display device 10 may be utilized as a squeeze sensing button SB. The squeezing force applied to the eighth force sensitive cell CE8 may be larger than the force applied to the first to seventh force sensitive cells CE1 to CE7. When a squeezing pressure is sensed from the eighth force sensitive cell CE8 on each of the left curved portion and the right curved portion, the main processor 710 may control so that a predetermined application or operation is performed. For example, when a squeezing pressure is sensed from the eighth force sensitive cell CE8 on each of the left curved portion and the right curved portion, the main processor 710 may control the display device 10 so that it is turned on from the sleep mode.

According to the exemplary embodiment shown in FIGS. 10A and 10B, the first force sensor 510 and the second force sensor 520 are disposed in the second areas DR2 corresponding to the curved portions of the display device 10, such that they may be utilized on behalf of physical buttons such as a volume control button, a power button, a call button, a camera button, an Internet button and a squeezing sensing button.

In addition, when a force is applied to the first force sensor 510 and the second force sensor 520, the main processor 710 can control the vibration generator 901 (see FIG. 2) so that it vibrates. The vibration of the vibration generator 901 when a force is applied to the first force sensor 510 may be different from the vibration of the vibration generator 901 when a force is applied to the second force sensor 520. The vibration of the vibration generator 901 may be different depending on which one of the first to eighth force sensitive cells CE1 to CE8 of the first force sensor 510 and the first to eighth force sensitive cells CE1 to CE8 of the second force sensor 520 receives a force. The vibration of the vibration generator 901 can be adjusted by adjusting the vibration frequency, the vibration displacement, and/or the vibration period of the vibration generator 901.

According to the exemplary embodiment shown in FIGS. 10A and 10B, when a force is sensed by the first to eighth force sensitive cells CE1 to CE8 of the first force sensor 510 and the first to eighth force sensitive cells CE1 to CE8 of the second force sensor 520, the vibration generator 901 vibrates to provide the user with various tactile senses, that is, a haptic feedback.

In addition, according to the exemplary embodiment shown in FIGS. 10A and 10B, when there is a user's input through the input sensing device, the vibration generator vibrates, so that a haptic feedback can be provided to the user. In FIGS. 10A and 10B, the force sensors 510 and 520 are illustrated as the input sensing devices. It is, however, to be understood that the present disclosure is not limited thereto. For example, the touch sensing device 200, the fingerprint recognition sensor or the camera device 720 may be used as the input sensing device. For example, when the user's touch is recognized through the touch sensing device 200, the vibration generator 901 may vibrate to provide a haptic feedback to the user. Alternatively, when a user's fingerprint is recognized through the fingerprint recognition sensor, the vibration generator 901 may vibrate to provide a haptic feedback to the user. Alternatively, when a user's fingerprint is recognized through the iris recognition sensor, the vibration generator 901 may vibrate to provide a haptic feedback to the user.

Figure 12:
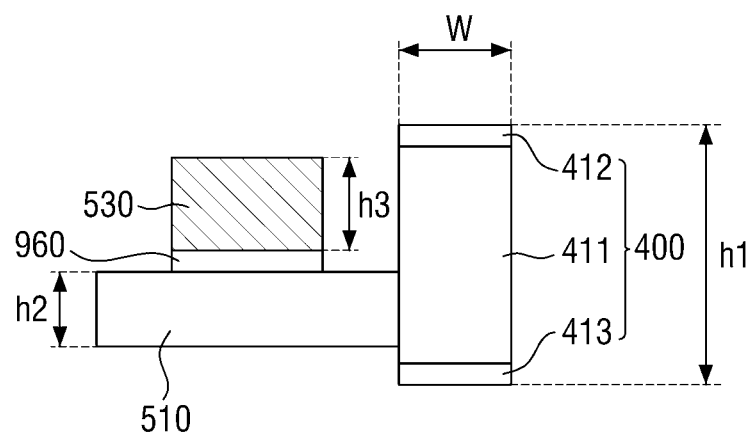
FIG. 12 is a cross-sectional view of an exemplary embodiment of the first force sensor, the first bump and the waterproof member of FIG. 11.

FIG. 11 is a cross-sectional view showing an exemplary embodiment, taken along line I-I' of FIGS. 3 and 4. FIG. 12 is a cross-sectional view of an exemplary embodiment of the first force sensor, the first bump and the first waterproof member of FIG. 11.

Referring to FIGS. 11 and 12, the cover window 100, the touch sensing device 200, the display panel 300, the panel support member 390, and the frame 600 may be formed flat in the first region DR1, and may be formed as a curved surface in the second region DR2. A first adhesive member 910 may attach the cover window 100 and the touch sensing device 200. A second adhesive member 920 may attach the touch sensing device 200 and the display panel 300. A third adhesive member 930 may attach the display panel 300 and the panel support member 390.

The first force sensor 510 may be disposed in the second region DR2 that corresponds to a curved portion of the display device 10. The first bumps 530 may be disposed on the first force sensor 510. Each of the first bumps 530 may be attached to the lower surface of the panel support member 390 through the fourth adhesive member 940 and may be attached to the upper surface of the first force sensor 510 through the sixth adhesive member 960. In addition, the first force sensor 510 may be attached to the upper surface of the frame 600 through a fifth adhesive member 950. The fourth adhesive member 940, the fifth adhesive member 950 and the sixth adhesive member 960 may be pressure-sensitive adhesives (PSA). Either the fourth adhesive member 940 or the fifth adhesive member 950 may be omitted.

The waterproof member 400 may be disposed on the outer side of the first force sensor 510. That is to say, the waterproof member 400 may be disposed on one side of the first force sensor 510, and the side of the first force sensor 510 may be disposed closer to the edge of one side of the display panel 300 than other side surfaces. For example, when the first force sensor 510 is disposed at the right edge of the display panel 300 as shown in FIG. 11, the waterproof member 400 may be attached to the right side surface of the first force sensor 510.

The waterproof member 400 may be attached to the lower surface of the panel support member 390 and the upper surface of the frame 600. To this end, as shown in FIG. 12, the waterproof member 400 may include a base film 411, a first adhesive layer 412 disposed on a surface of the base film 411, and a second adhesive layer 413 disposed on the other surface of the base film 411. The base film 411 may be a polyethylene terephthalate (PET), a polyethylene-terephthalate (PET) and a cushion layer, or a polyethylene foam (PE-foam). The first adhesive layer 412 and the second adhesive layer 413 may be a pressure-sensitive adhesive (PSA). The first adhesive layer 412 may be adhered to the lower surface of the panel support member 390, and the second adhesive layer 413 may be adhered to the upper surface of the frame 600.

The waterproof member 400 may be attached to the lower surface of the panel support member 390 and the upper surface of the frame 600 by pressing it. When the height h1 of the waterproof member 400 is smaller than the sum of the height h2 of the first force sensor 510 and the height h3 of the first bump 530, the first force sensor 510 may be damaged by the force for attaching the waterproof member 400, as shown in FIG. 12. Accordingly, the height h1 of the waterproof member 400 is preferably higher than the sum of the height h2 of the first force sensor 510 and the height h3 of the first bumps 530. However, if the height h1 of the waterproof member 400 is much larger than the sum of the height h2 of the first force sensor 510 and the height h3 of the first bumps 530, the force may not be sensed by the first force sensor 510. Therefore, it is desired to determine the height h1 of the waterproof member 400 in advance by performing experiments so that the first force sensor 510 is not damaged by the force for attaching the waterproof member 400 while a force can be sensed by the first force sensor 510 after the waterproof member 400 is attached.

In addition, in order for the first bumps 530 to press the force sensitive cells CE1 to CE8 of the first force sensor 510 in accordance with the force applied by the user, it is desired that the height h3 of the first bumps 530 is higher than the height h2 of the first force sensor 510.

In addition, it is desired that the width w of the waterproof member 400 is at least 1 mm to prevent or reduce permeation of moisture and dust.

According to the exemplary embodiment shown in FIGS. 11 and 12, the waterproof member 400 is disposed on the outer side of the first force sensor 510 so that the lower surface of the panel support member 390 is attached to the upper surface of the frame 600. Accordingly, it is possible to prevent or reduce moisture or dust from permeating between the display panel 300 and the frame 600 by the waterproof member 400. That is to say, the display device 10 with waterproof and dustproof capabilities can be produced.

The second force sensor 520 is substantially identical to the first force sensor 510 except that the waterproof member 400 is disposed on the left side surface of the second force sensor 520 since the second force sensor 520 is disposed at the left edge of the display panel 300; and, therefore, the second force sensor 520 will not be described in detail.

Figure 13:
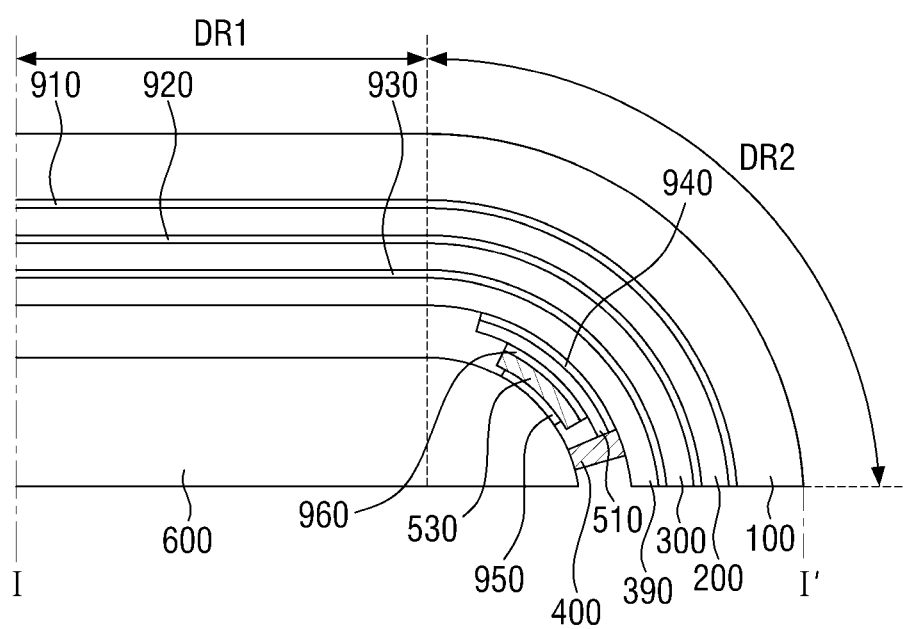
FIG. 13 is a cross-sectional view of another exemplary embodiment, taken along line I-I' of FIGS. 3 and 4.
Figure 13:
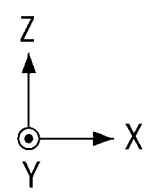

FIG. 13 is a cross-sectional view of another exemplary embodiment, taken along line I-I' of FIGS. 3 and 4.

The exemplary embodiment shown in FIG. 13 is different from the exemplary embodiment shown in FIG. 11 in that each of the first bumps 530 is disposed under the first force sensor 510. Therefore, the elements of FIG. 13 identical to those of FIG. 11 will not be described to avoid redundancy.

Referring to FIG. 13, the first force sensor 510 may be attached to the lower surface of the panel support member 390 through the fourth adhesive member 940. In addition, the first bumps 530 are disposed under the first force sensor 510. Each of the first bumps 530 may be attached to the upper surface of the frame 600 through the fifth adhesive member 950 and may be attached to the lower surface of the first force sensor 510 through the sixth adhesive member 960. The fourth adhesive member 940, the fifth adhesive member 950 and the sixth adhesive member 960 may be pressure sensitive adhesives (PSA). Either the fourth adhesive member 940 or the fifth adhesive member 950 may be omitted.

According to the exemplary embodiment shown in FIG. 13, the first bumps 530 are disposed under the first force sensor 510, and thus when a force is applied to the first force sensor 510, the lower surface of the first force sensor 510 can be pressed by the first bumps 530. Accordingly, the force applied by the user can be sensed by the first force sensor 510.

Figure 14:
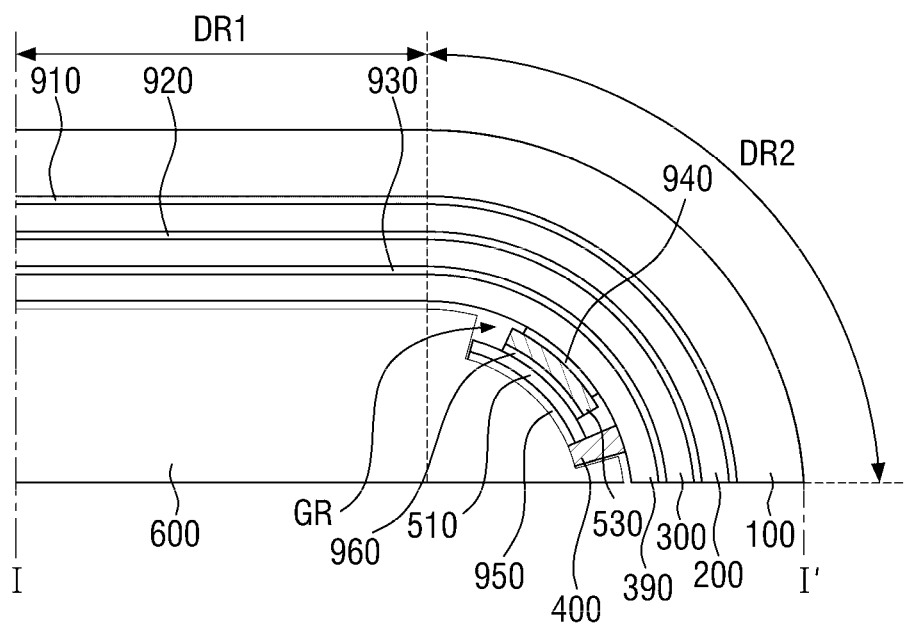
FIG. 14 is a cross-sectional view of yet another exemplary embodiment, taken along line I-I' FIGS. 3 and 4.
Figure 14:
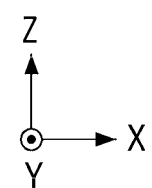

FIG. 14 is a cross-sectional view of yet another exemplary embodiment, taken along line I-I' of FIGS. 3 and 4.

The exemplary embodiment shown in FIG. 14 is different from the exemplary embodiment shown in FIG. 11 in that a waterproof member 400 and a first force sensor 510 are disposed in a groove GR formed in the upper surface of the frame 600. Accordingly, the elements of FIG. 14 identical to those of FIG. 11 will not be described to avoid redundancy.

Referring to FIG. 14, a groove GR for receiving the waterproof member 400 and the first force sensor 510 may be formed in the upper surface of the frame 600. The groove GR may be formed by recessing a part of the upper surface of the frame 600.

The groove GR may be formed in each of the second regions DR2 of the frame 600. The groove GR may be formed at the left edge and right edge of the frame 600. The groove GR may have a rectangular shape having the shorter sides in the first direction (x-axis direction) and the longer sides in the second direction (y-axis direction) when viewed from the top. In order to dispose the waterproof member 400 and the first force sensor 510 in the groove GR, the shorter sides of the groove GR may be longer than the shorter sides of the first force sensor 510, and the longer sides of the groove GR may be longer than the longer sides of the first force sensor 510.

The first force sensor 510 may be disposed in the groove GR. The first bumps 530 may be disposed on the first force sensor 510. Each of the first bumps 530 may be attached to the lower surface of the panel support member 390 through the fourth adhesive member 940 and may be attached to the upper surface of the first force sensor 510 through the sixth adhesive member 960. In addition, the first force sensor 510 may be attached to the bottom of the groove GR through the fifth adhesive member 950. The fourth adhesive member 940, the fifth adhesive member 950 and the sixth adhesive member 960 may be pressure-sensitive adhesives (PSA). Either the fourth adhesive member 940 or the fifth adhesive member 950 may be omitted. Although the first bumps 530 are disposed on the first force sensor 510 in FIG. 14, the present disclosure is not limited thereto. The first bumps 530 may be disposed under the first force sensor 510, similar to the exemplary embodiment FIG. 13.

The waterproof member 400 may be disposed on the outer side of the first force sensor 510 in the groove GR. That is to say, the waterproof member 400 may be disposed on one side surface of the first force sensor 510 in the groove GR, and the side surface of the first force sensor 510 may be disposed closer to the edge of one side of the display panel 300 than the other side surfaces thereof. For example, when the first force sensor 510 is disposed at the right edge of the display panel 300 as shown in FIG. 14, the waterproof member 400 may be disposed on the right side surface of the first force sensor 510 in the groove GR. The waterproof member 400 may be attached to the lower surface of the panel support member 390 and to the bottom of the groove GR of the frame 600. Therefore, the waterproof member 400 may be higher than the groove GR.

According to the exemplary embodiment shown in FIG. 14, the waterproof member 400 and the first force sensor 510 are disposed in the groove GR formed in the upper surface of the frame 600, the waterproof member 400 is disposed on the outer side of the first force sensor 510 in the groove GR, and the lower surface of the panel support member 390 is attached to the bottom of the groove GR. Accordingly, it is possible to prevent or reduce the moisture or dust from permeating between the display panel 300 and the frame 600 by the waterproof member 400. That is to say, the display device 10 with waterproof and dustproof capabilities can be produced.

The groove GR in which the waterproof member 400 and the second force sensor 520 are disposed is substantially identical to the groove GR in which the waterproof member 400 and the first force sensor 510 are disposed, except that the former is disposed at the left edge of the display panel 300; and, therefore, the redundant description will be omitted.

Figure 15:
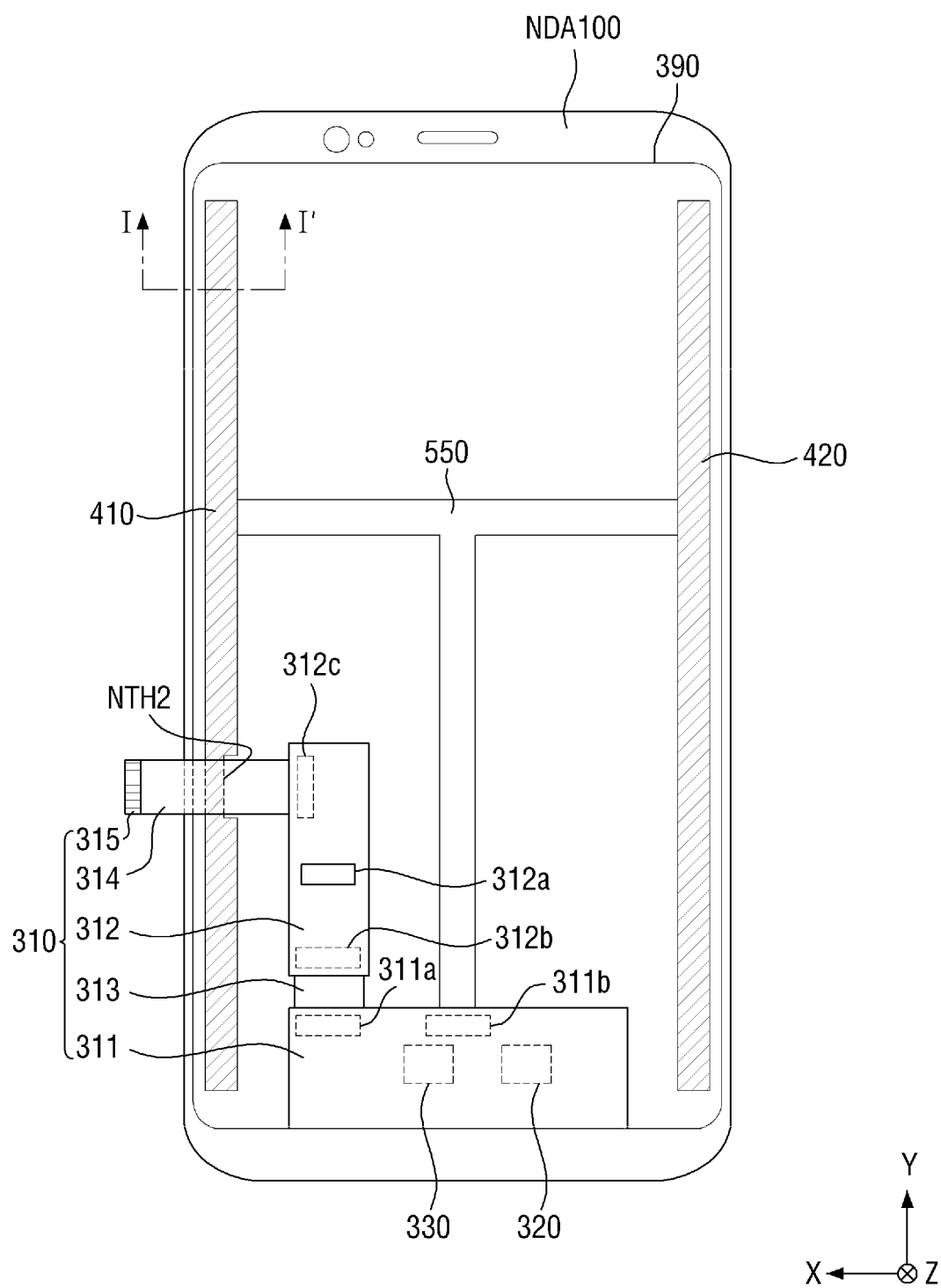
FIG. 15 is a bottom view of a display panel attached to a cover window according to yet another exemplary embodiment.
Figure 16:
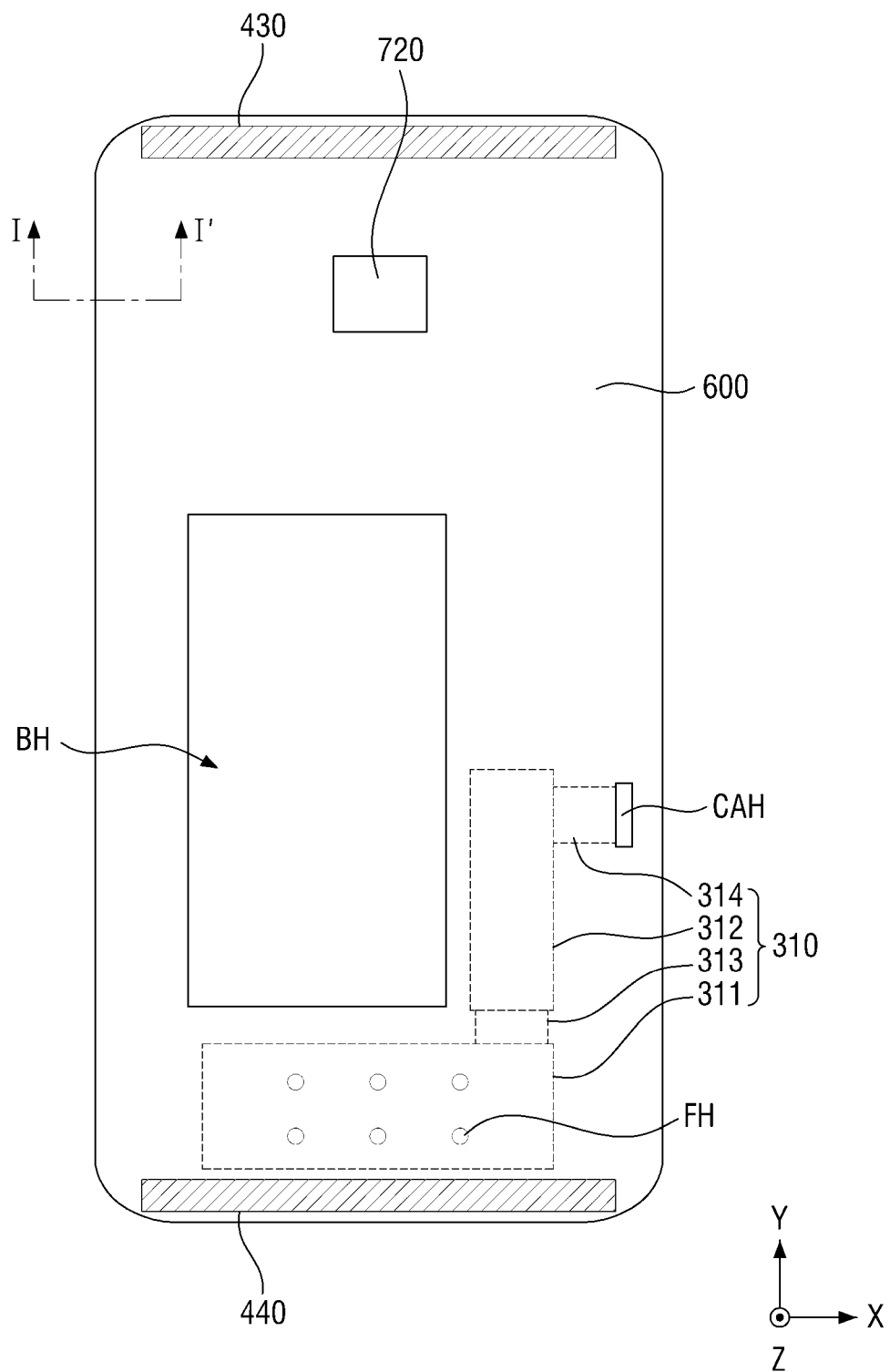
FIG. 16 is a plan view showing a frame according to yet another exemplary embodiment.

FIG. 15 is a bottom view of a display panel attached to a cover window according to yet another exemplary embodiment. FIG. 16 is a plan view showing a frame according to yet another exemplary embodiment.

The exemplary embodiment shown in FIGS. 15 and 16 is different from the exemplary embodiment shown in FIGS. 11 and 12 in that a first waterproof member 410 is attached to the lower surface of a first force sensor 510, a second waterproof member 420 is attached to the lower surface of a second force sensor 520, and a third waterproof member 430 and a fourth waterproof member 440 are attached to the upper surface of the frame 600, instead of the waterproof member 400. Therefore, the elements of FIGS. 15 and 16 identical to those of FIGS. 11 and 12 will not be described to avoid redundancy.

Referring to FIGS. 15 and 16, the first waterproof member 410 may be disposed on the upper, lower, and outer sides of the first force sensor 510. For example, when the first force sensor 510 is disposed at the right edge of the display panel 300 as shown in FIG. 15, the first waterproof member 410 may be disposed on the upper, lower and right sides of the first force sensor. In this case, the lower surface of the panel support member 390, the upper surface of the frame 600, and the right side surface of the first force sensor 510 may be attached to the first waterproof member 410.

A second recess NTH2 in the form of a notch may be formed in a portion of the first waterproof member 410 in line with the cable hole CAH of the frame 600. The second recess NTH2 may be formed on one side of the first waterproof member 410. In this case, since the second recess NTH2 of the first waterproof member 410 should not cover the first recess NTH1 of the first force sensor 510, it is desired that the width of the second recess NTH2 of the first waterproof member 410 is larger than the width of the first recess NTH1 of the first force sensor 510, taking into account the process error.

The second waterproof member 420 may be disposed on the upper side, lower side and the outer side of the second force sensor 520. For example, when the second force sensor 520 is disposed at the left edge of the display panel 300 as shown in FIG. 15, the second waterproof member 420 may be disposed on the upper, lower and left sides of the second force sensor. In this case, the lower surface of the panel support member 390, the upper surface of the frame 600 and the left side surface of the second force sensor 520 may be attached to the second waterproof member 420.

The third waterproof member 430 may be disposed on the upper side of the frame 600, and the fourth waterproof member 440 may be disposed on the lower side of the frame 600. The upper side of the frame 600 is opposed to the lower side of the frame 600. Each of the third waterproof member 430 and the fourth waterproof member 440 may be attached to the lower surface of the cover window 100 and the upper surface of the frame 600.

The panel support member 390 may be attached to the frame 600 by the first waterproof member 410, the second waterproof member 420, the third waterproof member 430 and the fourth waterproof member 440. In order to prevent or reduce moisture or dust from permeating, a waterproof resin layer may be formed between the first waterproof member 410 and the third waterproof member 430, between the first waterproof member 410 and the fourth waterproof member 440, between the second waterproof member 420 and the third waterproof member 430 and between the second waterproof member 420 and the fourth waterproof member 440.

Figure 17:
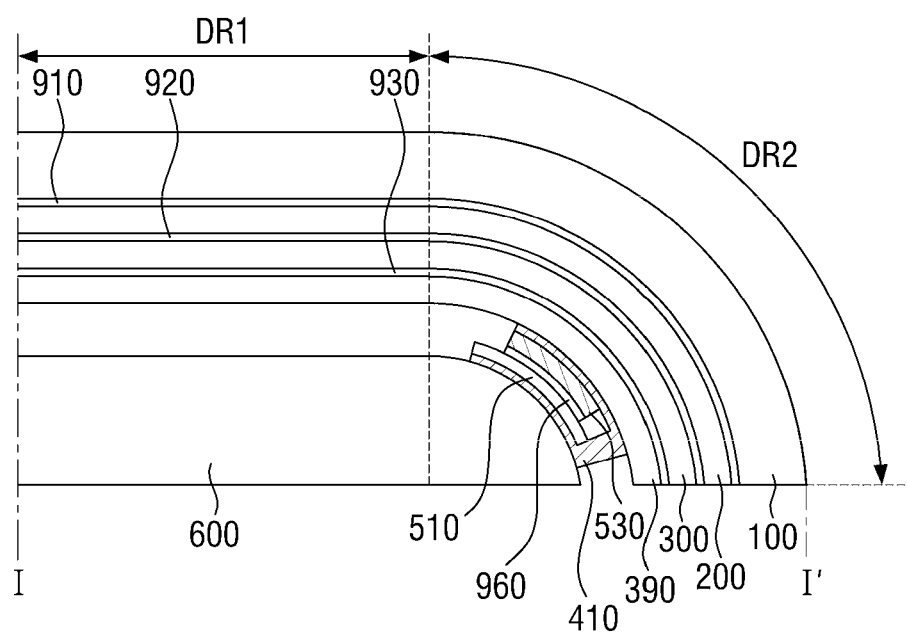
FIG. 17 is a cross-sectional view showing an exemplary embodiment, taken along line I-I' of FIGS. 15 and 16.
Figure 17:
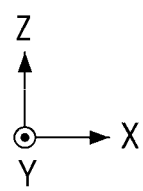

FIG. 17 is a cross-sectional view showing an example, taken along line I-I' of FIGS. 15 and 16.

Referring to FIG. 17, the cover window 100, the touch sensing device 200, the display panel 300, the panel support member 390, and the frame 600 may be formed flat in the first region DR1, and may be formed as a curved surface in the second region DR2.

The first force sensor 510 may be disposed in the second region DR2 that corresponds to a curved portion of the display device 10. The first bumps 530 may be disposed on the upper surface of the first force sensor 510.

The first waterproof member 410 may be disposed on the upper side, lower side and the outer side of the first force sensor 510. Specifically, the first waterproof member 410 may be disposed in a U-shape so that it surrounds the upper surface of the first bumps 530 disposed on the first force sensor 510 and the lower surface and a side surface of the first force sensor 510. The side surface of the first force sensor 510 may be disposed closer to the edge of one side of the display panel 300 than the other side surfaces thereof. For example, when the first force sensor 510 is disposed at the right edge of the display panel 300 as shown in FIG. 17, the first waterproof member 410 may be attached to the right side surface of the first force sensor 510.

The first waterproof member 410 may be disposed between the lower surface of the first force sensor 510 and the frame 600 and may be disposed between the first bumps 530 disposed on the first force sensor 510 and the lower surface of the panel support member 390. Accordingly, the first force sensor 510 may be disposed between the lower surface of the panel support member 390 and the frame 600, and the lower surface of the panel support member 390 may be attached to the upper surface of the frame 600 by the first waterproof member 410.

Figure 18:
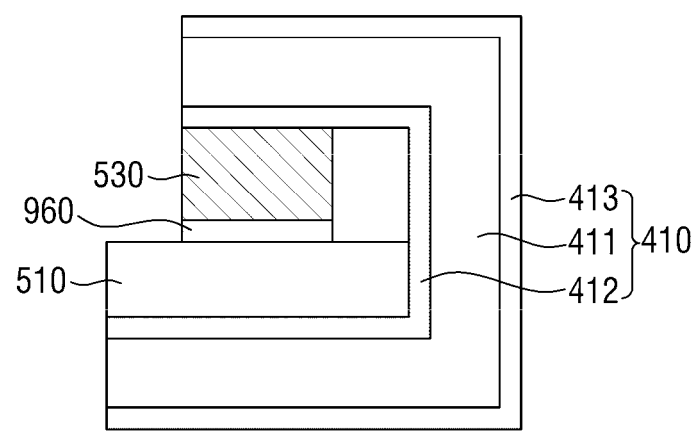
FIG. 18 is a cross-sectional view of an exemplary embodiment of the first force sensor, the first bump and the first waterproof member of FIG. 17.

Specifically, as shown in FIG. 18, the waterproof member 410 may include a base film 411, a first adhesive layer 412 disposed on a surface of the base film 411, and a second adhesive layer 413 disposed on the other surface of the base film 411. The first adhesive layer 412 may be attached to the upper surface of the first bumps 530 and the lower surface and a side surface of the first force sensor 510. The second adhesive layer 413 may be attached to the lower surface of the panel support member 390 and the upper surface of the frame 600.

The base film 411 may be a polyethylene terephthalate (PET), a film in which polyethylene terephthalate (PET) is coupled with a cushion layer, or a polyethylene foam (PE-foam). The first adhesive layer 412 and the second adhesive layer 413 may be pressure-sensitive adhesives (PSA).

Figure 19:
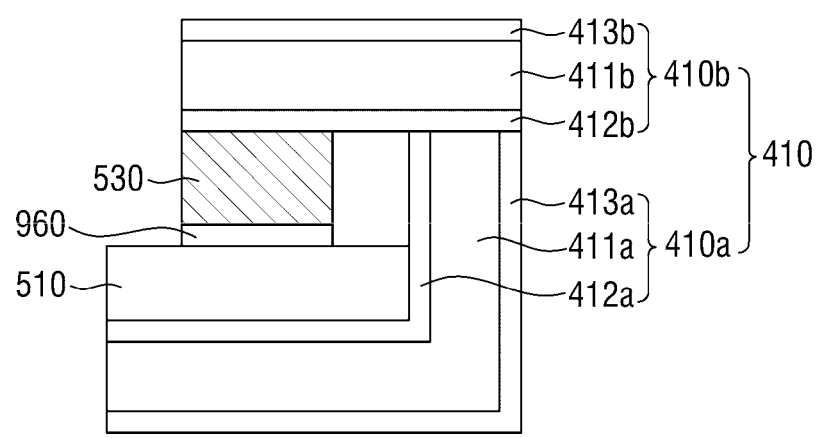
FIG. 19 is a cross-sectional view of another exemplary embodiment of the first force sensor, the first bump and the first waterproof member of FIG. 17.

Alternatively, the first waterproof member 410 may include a 1A waterproof member 410a and a 1B waterproof member 410b, as shown in FIG. 19. The 1A waterproof member 410a may be disposed in an L-shape so that it surrounds the lower surface and a side surface of the first force sensor 510. The 1B waterproof member 410b may be disposed in a "–" shape on the first bumps 530 and the first 1A waterproof member 410a. Alternatively, the 1A waterproof member 410a may be disposed in an inverted L-shape so that it surrounds the upper surface and a side surface of the first force sensor 510. The 1B waterproof member 410b may be disposed in a "–" shape under the first bumps 530 and the first 1A waterproof member 410a.

The 1A waterproof member 410a may include a 1A base film 411a, a 1A adhesive layer 412a disposed on one surface of the 1A base film 411a, and a 2A adhesive layer 413a disposed on the other surface of the 1A base film 411a. The 1A adhesive layer 412a may be attached to the lower surface and a side surface of the first force sensor 510. The 2A adhesive layer 413a may be attached to the upper surface of the frame 600.

The 1B waterproof member 410b may include a 1B base film 411b, a 1B adhesive layer 412b disposed on one surface of the 1B base film 411b, and a 2B adhesive layer 413b disposed on the other surface of the 1B base film 411b. The 1B adhesive layer 412b may be attached to the upper surface of the first bumps 530 and the upper surface of the 1A waterproof member 410a. The 2B adhesive layer 413b may be attached to the upper surface of the panel support member 390.

Each of the 1A base film 411a and the 1B base film 411b may be a polyethylene terephthalate (PET), a film in which polyethylene terephthalate (PET) is coupled with a cushion layer, or a polyethylene foam (PE-foam). Each of the 1A adhesive layer 412a, the 2A adhesive layer 413a, the 1B adhesive layer 412b, and the 2B adhesive layer 413b may be a pressure-sensitive adhesive (PSA).

Figure 20:
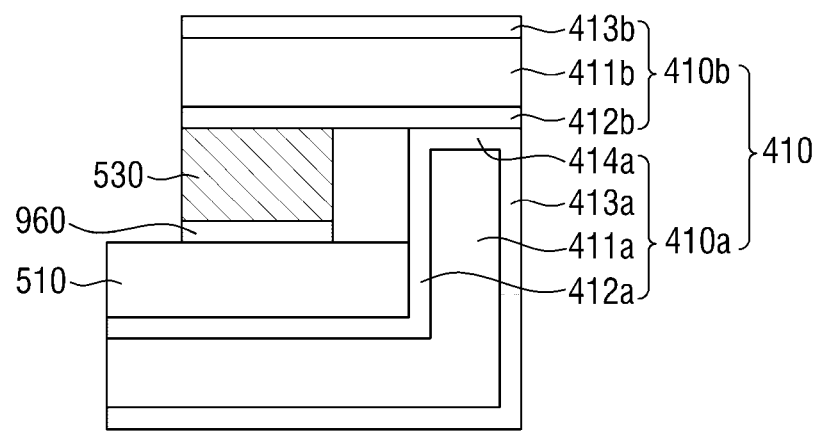
FIG. 20 is a cross-sectional view of another exemplary embodiment of the first force sensor, the first bump and the first waterproof member of FIG. 17.

In FIG. 19, the 1B adhesive layer 412b is attached to the side surface of the 1A adhesive layer 412a of the 1A waterproof member 410a and the side surface of the 2A adhesive layer 413a. In this example, since the contact area between the 1A water waterproof member 410a and the 1B adhesive layer 412b is small, the adhesive force between the 1A waterproof member 410a and the 1B adhesive layer 412b may be weak. To improve the adhesive force, the 1A waterproof member 410a may include a 3A adhesive layer 414a disposed on the upper surface of the 1A waterproof member 410a that connects the 1A adhesive layer 412a with the 2A adhesive layer 413a, as shown in FIG. 20. In this case, the 1B adhesive layer 412b may be attached to the upper surface of the 3A adhesive layer 414a of the 1A waterproof member 410a as shown in FIG. 20. By doing so, the contact area between the 1A waterproof member 410a and the 1B waterproof member 410b can be increased as compared with the exemplary embodiment shown in FIG. 19, so that the adhesive force between the 1A waterproof member 410a and the 1B waterproof member 410b can be enhanced.

Each of the 1A base film 411a and the 1B base film 411b may be a polyethylene terephthalate (PET), a film in which polyethylene terephthalate (PET) is coupled with a cushion layer, or a polyethylene foam (PE-foam). Each of the 1A adhesive layer 412a, the 2A adhesive layer 413a, the 3A adhesive layer 414a, the 1B adhesive layer 412b and the 2B adhesive layer 413b may be a pressure-sensitive adhesive (PSA).

According to the exemplary embodiment shown in FIG. 17, the first waterproof member 410 is disposed such that it surrounds the upper, lower and outer sides of the first force sensor 510, so that the lower surface of the panel support member 390 is attached to the upper surface of the frame 600. Accordingly, it is possible to prevent or reduce moisture or dust from permeating between the display panel 300 and the frame 600 by the first waterproof member 410. That is to say, the display device 10 with waterproof and dustproof capabilities can be produced.

Moreover, according to the exemplary embodiment shown in FIG. 17, since the first waterproof member 410 and the first force sensor 510 can be integrally implemented, there is the advantage that it is not necessary to determine the height of the first waterproof member 410 by taking into account the height of the first force sensor 510 and the height of the first bumps 530, unlike the exemplary embodiment shown in FIG. 11.

The second force sensor 520 is substantially identical to the first force sensor 510 except that the second waterproof member 420 surrounds the upper, lower and left sides of the second force sensor 520 since the second force sensor 520 is disposed at the left edge of the display panel 300; and, therefore, the second waterproof member 420 and the second force sensor 520 will not be described in detail.

Figure 21:
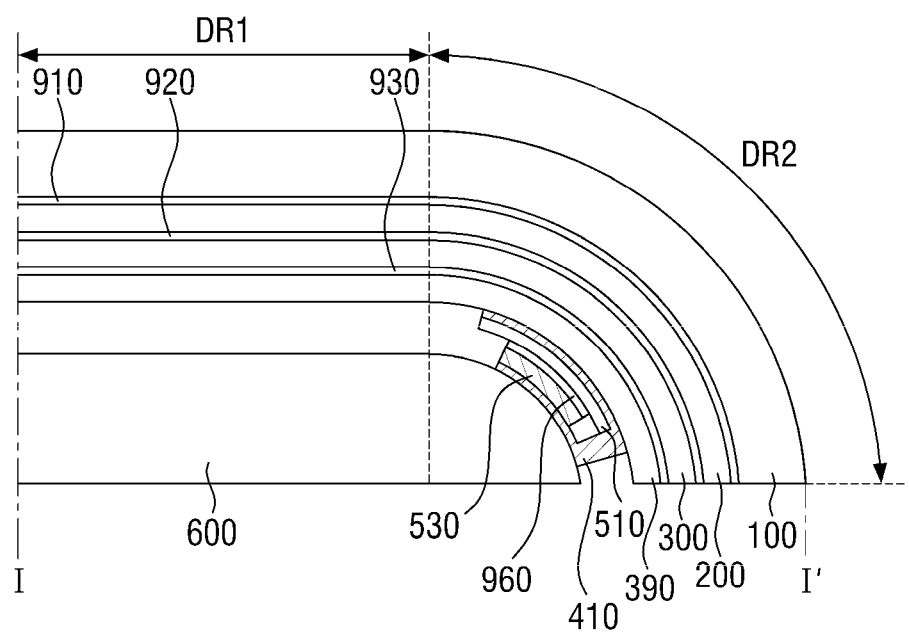
FIG. 21 is a cross-sectional view showing yet another exemplary embodiment, taken along line I-I' of FIGS. 15 and 16.

FIG. 21 is a cross-sectional view showing yet another example, taken along line I-I' of FIGS. 15 and 16.

The exemplary embodiment shown in FIG. 21 is different from the exemplary embodiment shown in FIG. 17 in that each of the first bumps 530 is disposed under the first force sensor 510. Therefore, the elements of FIG. 21 identical to those of FIG. 17 will not be described to avoid redundancy.

Referring to FIG. 21, the first waterproof member 410 may be disposed between the first bumps 530 and the frame 600 disposed under the first force sensor 510 and may be disposed between the upper surface of the first force sensor 510 and the lower surface of the panel support member 390. Accordingly, the first force sensor 510 may be disposed between the lower surface of the panel support member 390 and the frame 600, and the lower surface of the panel support member 390 may be attached to the upper surface of the frame 600 by the first waterproof member 410.

According to the exemplary embodiment shown in FIG. 21, the first bumps 530 are disposed under the first force sensor 510, and thus when a force is applied to the first force sensor 510, the lower surface of the first force sensor 510 can be pressed by the first bumps 530. Accordingly, the force applied by the user can be sensed by the first force sensor 510.

Figure 22:
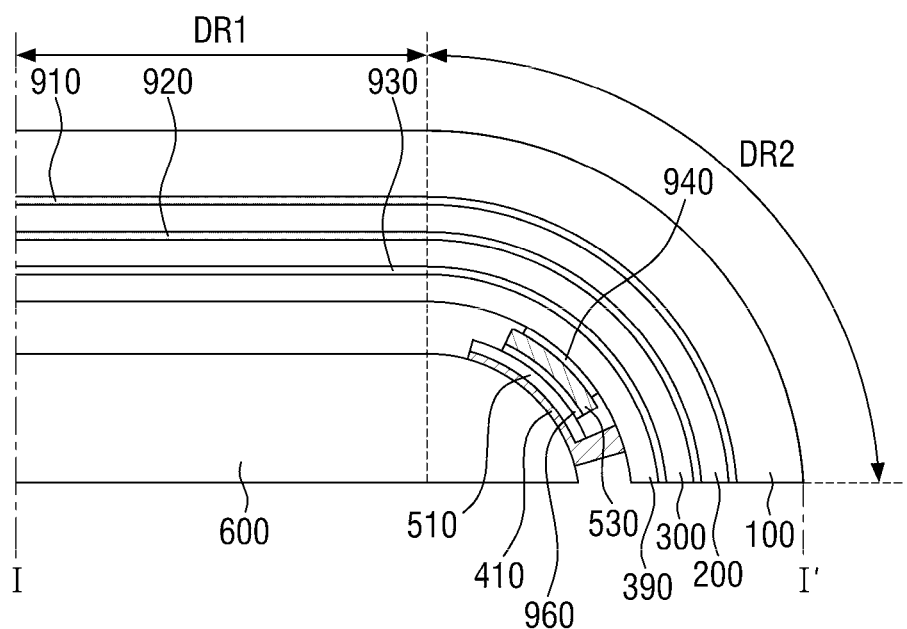
FIG. 22 is a cross-sectional view showing yet another exemplary embodiment, taken along line I-I' of FIGS. 15 and 16.

FIG. 22 is a cross-sectional view showing yet another exemplary embodiment, taken along line I-I' of FIGS. 15 and 16.

The exemplary embodiment shown in FIG. 22 is different from the exemplary embodiment shown in FIG. 17 in that a first waterproof member 410 is disposed under and on the outer side of a first force sensor 510 and not on the upper side of the first waterproof member 410. Accordingly, the elements of FIG. 22 identical to those of FIG. 17 will not be described to avoid redundancy.

Referring to FIG. 22, the first waterproof member 410 may be disposed on the lower side and the outer side of the first force sensor 510. Specifically, the first waterproof member 410 may be disposed in an L-shape such that it surrounds the lower surface and a side surface of the first force sensor 510. The side surface of the first force sensor 510 may be disposed closer to the edge of one side of the display panel 300 than the other side surfaces thereof. For example, when the first force sensor 510 is disposed at the right edge of the display panel 300 as shown in FIG. 22, the first waterproof member 410 may be attached to the right side surface of the first force sensor 510.

The first waterproof member 410 may be disposed between the lower surface of the first force sensor 510 and the upper surface of the frame 600. The first waterproof member 410 may be disposed on one side of the first force sensor 510 and may be disposed between the lower surface of the panel support member 390 and the upper surface of the frame 600. Accordingly, the first force sensor 510 may be disposed between the lower surface of the panel support member 390 and the upper surface of the frame 600, and the lower surface of the panel support member 390 may be attached to the upper surface of the frame 600 by the first waterproof member 410. Each of the first bumps 530 disposed on the first force sensor 510 may be attached to the lower surface of the panel support member 390 through the fourth adhesive member 940. The fourth adhesive member 940 may be a pressure-sensitive adhesive (PSA). The fourth adhesive member 940 may be omitted.

Figure 23:
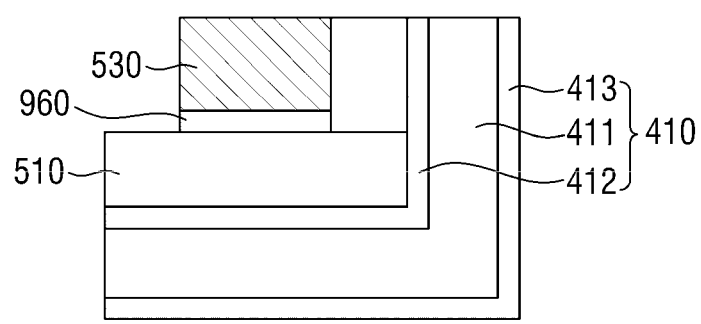
FIG. 23 is a cross-sectional view of an exemplary embodiment of the first force sensor, the first bump and the first waterproof member of FIG. 21.

Specifically, as shown in FIG. 23, the waterproof member 410 may include a base film 411, a first adhesive layer 412 disposed on a surface of the base film 411, and a second adhesive layer 413 disposed on the other surface of the base film 411. The first adhesive layer 412 may be attached to the lower surface and a side surface of the first force sensor 510. The second adhesive layer 413 may be attached to the upper surface of the frame 600. In addition, the side surface of the first adhesive layer 412 and the side surface of the second adhesive layer 413 on the upper surface of the first waterproof member 410 may be attached to the lower surface of the panel support member 390.

The base film 411 may be a polyethylene terephthalate (PET), a film in which polyethylene terephthalate (PET) is coupled with a cushion layer, or a polyethylene foam (PE-foam). The first adhesive layer 412 and the second adhesive layer 413 may be pressure-sensitive adhesives (PSA).

Figure 24:
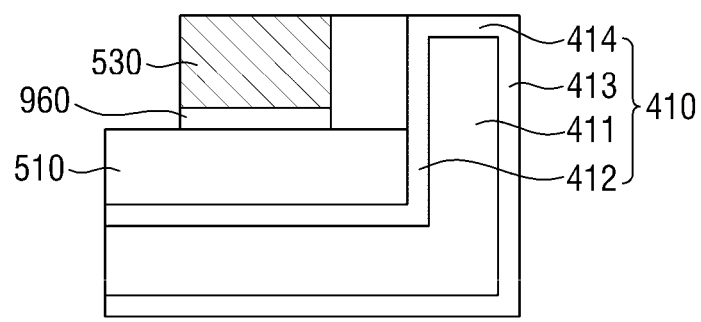
FIG. 24 is a cross-sectional view of another exemplary embodiment of the first force sensor, the first bump and the first waterproof member of FIG. 21.

In FIG. 23, the lower surface of the panel support member 390 is attached to the side surface of the first adhesive layer 412 and the side surface of the second adhesive layer 413. In this example, since the contact area between the first waterproof member 410 and the panel support member 390 is small, the adhesive force between the first waterproof member 410 and the panel support member 390 may be weak. To improve the adhesive force, the first waterproof member 410 may include a third adhesive layer 414 disposed on the upper surface of the first waterproof member 410 that connects the first adhesive layer 412 with the second adhesive layer 413, as shown in FIG. 24. In this exemplary embodiment, the lower surface of the panel support member 390 may be attached to the upper surface of the third adhesive layer 414 as shown in FIG. 24. Therefore, according to the exemplary embodiment shown in FIG. 24, the contact area between the first waterproof member 410 and the panel support member 390 can be increased as compared with the exemplary embodiment shown in FIG. 23, so that the adhesive force between the first waterproof member 410 and the panel support member 390 can be enhanced.

Figure 25:
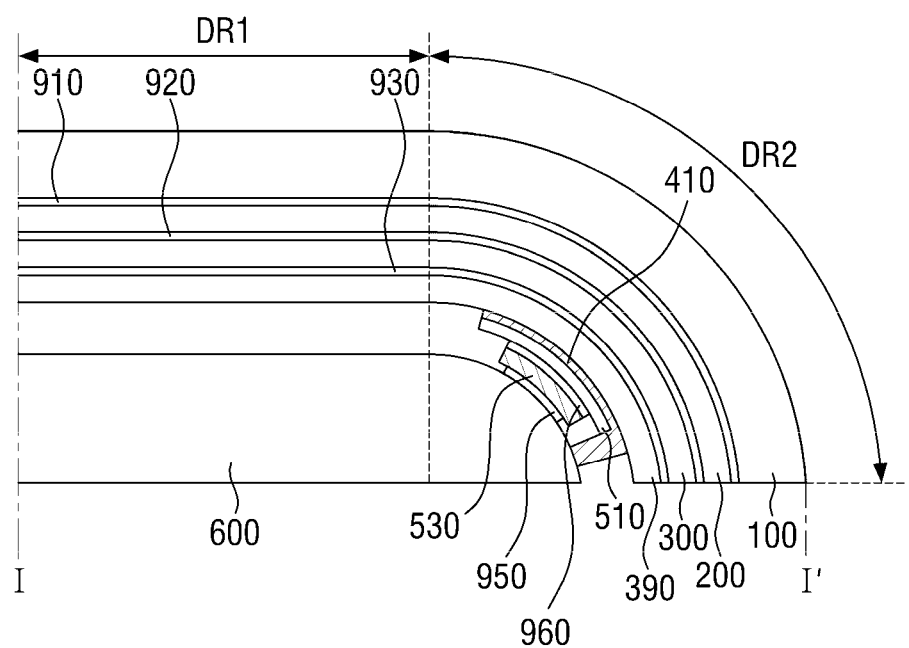
FIG. 25 is a cross-sectional view showing yet another exemplary embodiment, taken along line I-I' of FIGS. 15 and 16.
Figure 25:
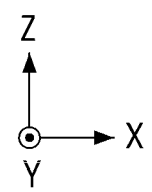

FIG. 25 is a cross-sectional view showing yet another exemplary embodiment, taken along line I-I' of FIGS. 15 and 16.

The exemplary embodiment shown in FIG. 25 is different from the exemplary embodiment shown in FIG. 22 in that each of the first bumps 530 is disposed under the first force sensor 510. Accordingly, the elements of FIG. 25 identical to those of FIG. 22 will not be described to avoid redundancy.

Referring to FIG. 25, the first bumps 530 are disposed between the first force sensor 510 and the upper surface of the frame 600. The first waterproof member 410 may be disposed on one side of the first force sensor 510 and may be disposed between the lower surface of the panel support member 390 and the upper surface of the frame 600. Accordingly, the first force sensor 510 may be disposed between the lower surface of the panel support member 390 and the upper surface of the frame 600, and the lower surface of the panel support member 390 may be attached to the upper surface of the frame 600 by the first waterproof member 410. The lower surface of the first bumps 530 may be attached to the upper surface of the frame 600 through the fifth adhesive member 950. The fifth adhesive member 950 may be a pressure-sensitive adhesive (PSA). The fifth adhesive member 950 may be omitted.

According to the exemplary embodiment shown in FIG. 25, the first bumps 530 are disposed under the first force sensor 510, and thus when a force is applied to the first force sensor 510, the lower surface of the first force sensor 510 can be pressed by the first bumps 530. Accordingly, the force applied by the user can be sensed by the first force sensor 510.

Figure 26:
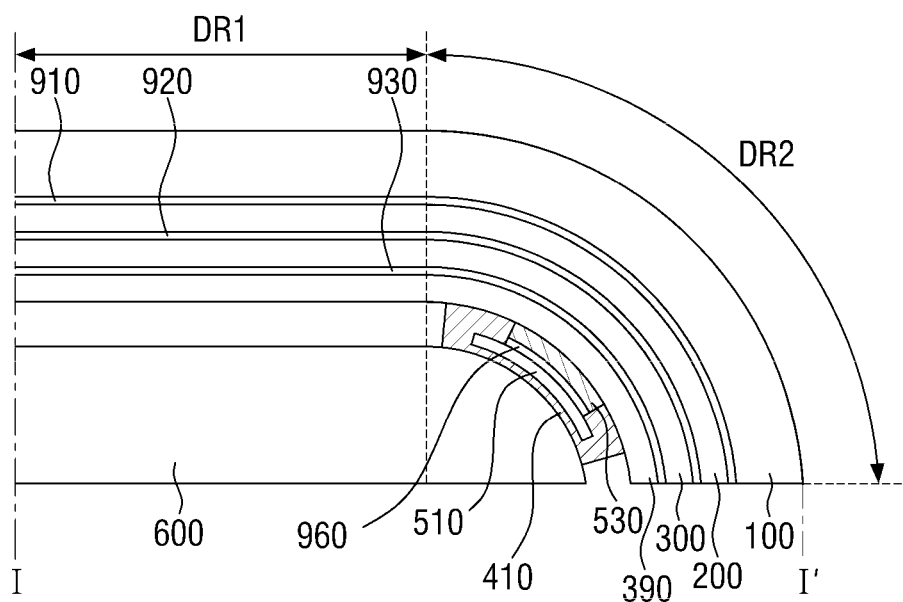
FIG. 26 is a cross-sectional view showing yet another exemplary embodiment, taken along line I-I' of FIGS. 15 and 16.

FIG. 26 is a cross-sectional view showing yet another exemplary embodiment, taken along line I-I' of FIGS. 15 and 16.

Referring to FIG. 26, a cover window 100, a touch sensing device 200, a display panel 300, a panel support member 390 and a frame 600 may be formed flat in the first region DR1 and may be formed as a curved surface in the second region DR2.

The first force sensor 510 may be disposed in the second region DR2 that corresponds to a curved portion of the display device 10. The first bumps 530 may be disposed on the upper surface of the first force sensor 510.

The first bumps 530 may be disposed on the upper surface of the first force sensor 510. The first waterproof member 410 may be disposed on the lower surface and side surfaces of the first force sensor 510 and may be disposed on a part of the upper surface of the first force sensor 510 that is not covered by the first bumps 530. In addition, the first waterproof member 410 may be disposed on the side surfaces of the first bumps 530.

The first waterproof member 410 may be disposed between the lower surface of the first force sensor 510 and the frame 600 and may be disposed between the part of the upper surface of the first force sensor 510 that is not covered by the first bumps 530 and the lower surface of the panel support member 390. Accordingly, the first force sensor 510 may be disposed between the lower surface of the panel support member 390 and the frame 600, and the lower surface of the panel support member 390 may be attached to the upper surface of the frame 600 by the first waterproof member 410.

Figure 27:
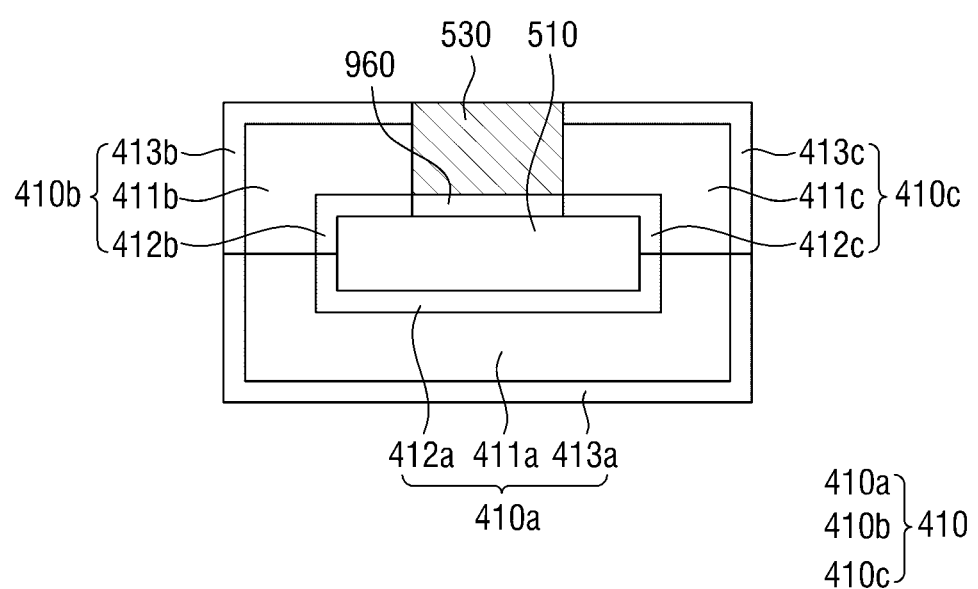
FIG. 27 is a cross-sectional view of an exemplary embodiment of the first force sensor, the first bump and the first waterproof member of FIG. 25.

Specifically, the first waterproof member 410 may include a 1A waterproof member 410a, a 1B waterproof member 410b and a 1C waterproof member 410c, as shown in FIG. 27. The 1A waterproof member 410a is disposed such that it surrounds the lower surface and the side surfaces of the first force sensor 510. The 1B waterproof member 410b is disposed such that it surrounds a part of the upper surface of the first force sensor 510 that is not covered by the first bump 530 and a part of the side surface of the first force sensor 510. The 1C waterproof member 410c is disposed such that it surrounds the other part of the upper surface of the first force sensor 510 that is not covered by the first bump 530 and the other part of the side surface of the first force sensor 510.

The 1A waterproof member 410a may include a 1A base film 411a, a 1A adhesive layer 412a disposed on one surface of the 1A base film 411a, and a 2A adhesive layer 413a disposed on the other surface of the 1A base film 411a. The 1A adhesive layer 412a may be attached to the lower surface and the side surfaces of the first force sensor 510. The 2A adhesive layer 413a may be attached to the upper surface of the frame 600.

The 1B waterproof member 410b may include a 1B base film 411b, a 1B adhesive layer 412b disposed on one surface of the 1B base film 411b, and a 2B adhesive layer 413b disposed on the other surface of the 1B base film 411b. The 1B adhesive layer 412b may be attached to a part of the upper surface of the first force sensor 510 that is exposed without being covered by the first bump 530. The 2B adhesive layer 413b may be attached to the lower surface of the panel support member 390. The side surface of the 1B adhesive layer 412b and the side surface of the 2B adhesive layer 413b may be attached to a part of each of the side surfaces of the first bump 530.

The 1C waterproof member 410c may include a 1C base film 411c, a 1C adhesive layer 412c disposed on a surface of the 1C base film 411c, and a 2C adhesive layer 413c disposed on the other surface of the 1C base film 411c. The 1C adhesive layer 412c may be attached to the other part of the upper surface of the first force sensor 510 that is exposed without being covered by the first bump 530. The 2C adhesive layer 413c may be attached to the lower surface of the panel support member 390. The side surface of the 1C adhesive layer 412c and the side surface of the 2C adhesive layer 413c may be attached to the rest part of each of the side surfaces of the first bump 530.

Each of the 1A base film 411a, and the 1B base film 411b and the 1C base film 411c may be a polyethylene terephthalate (PET), a film in which polyethylene terephthalate (PET) is coupled with a cushion layer, or a polyethylene foam (PE-foam). Each of the 1A adhesive layer 412a, the 2A adhesive layer 413a, the 1B adhesive layer 412b, the 2B adhesive layer 413b, the 1C adhesive layer 412c and the 2C adhesive layer 413c may be a pressure-sensitive adhesive (PSA).

Figure 28:
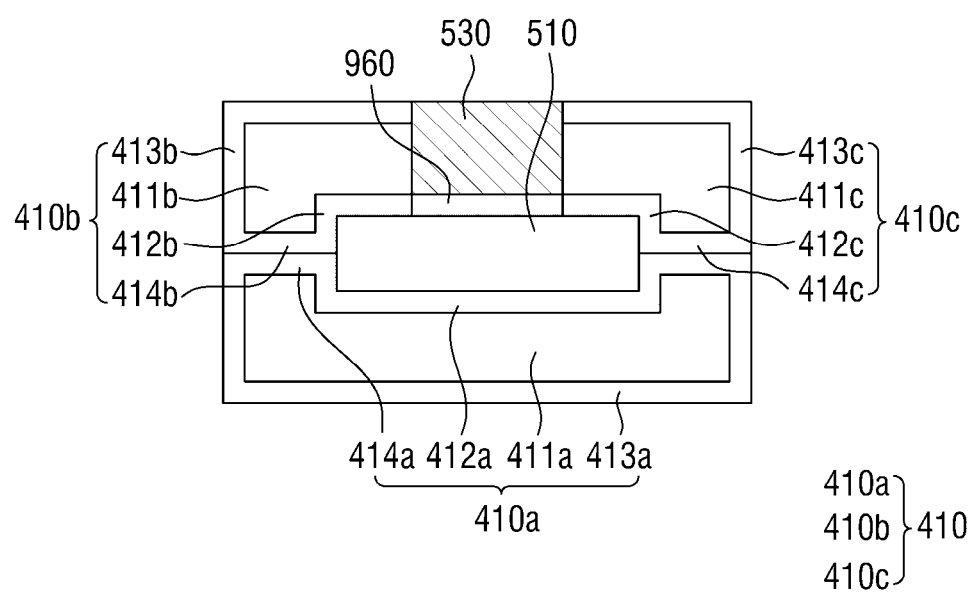
FIG. 28 is a cross-sectional view of another exemplary embodiment of the first force sensor, the first bump and the first waterproof member of FIG. 25.

In FIG. 27, the side surface of the 1B adhesive layer 412b is attached to the side surface of the 1A adhesive layer 412a, and the side surface of the 2B adhesive layer 413c is attached to the side surface of the 2A adhesive layer 413a. In addition, the side surface of the 1C adhesive layer 413c is attached to the side surface of the 1A adhesive layer 412a, and the side surface of the 2C adhesive layer 413c is attached to the side surface of the 2A adhesive layer 413a. In this example, since the contact area between the 1A waterproof member 410a and the 1B waterproof member 410b and the contact area between the 1A waterproof member 410a and the 1C waterproof member 410c are small, the adhesive force between the 1A waterproof member 410a and the 1B waterproof member 410b and the adhesive force between the 1A waterproof member 410a and the 1C waterproof member 410c may be weak. To improve the adhesive force, the 1A waterproof member 410a may include a 3A adhesive layer 414a disposed on the upper surface of the 1A waterproof member 410a that connects the 1A adhesive layer 412a with the 2A adhesive layer 413a, as shown in FIG. 28. In addition, the 1B waterproof member 410b may include a 3B adhesive layer 414b disposed on the lower surface of the 1B waterproof member 410b that connects the 1B adhesive layer 412b with the 2B adhesive layer 413b. In addition, the 1C waterproof member 410c may include a 3C adhesive layer 414c disposed on the lower surface of the 1C waterproof member 410c that connects the 1C adhesive layer 412c with the 2C adhesive layer 413c. By doing so, the contact area between the 1A waterproof member 410a and the 1B waterproof member 410b and the contact area between the 1A waterproof member 410a and the 1C waterproof member 410c can be increased as shown in FIG. 28, so that the adhesive force between the 1A waterproof member 410a and the 1B waterproof member 410b and the adhesive force between the 1A waterproof member 410a and the 1C waterproof member 410c can be enhanced.

According to the exemplary embodiment shown in FIG. 26, the first waterproof member 410 is disposed on the upper surface, the lower surface and the side surfaces of the first force sensor 510 such that it attaches the lower surface of the panel support member 390 to the upper surface of the frame 600. Accordingly, it is possible to prevent or reduce moisture or dust from permeating between the display panel 300 and the frame 600 by the first waterproof member 410. That is to say, the display device 10 with waterproof and dustproof capabilities can be produced.

Moreover, according to the exemplary embodiment shown in FIG. 26, since the first waterproof member 410 and the first force sensor 510 can be integrally implemented, there is the advantage that it is not necessary to determine the height of the first waterproof member 410 by taking into account the height of the first force sensor 510 and the height of the first bumps 530, unlike the exemplary embodiment shown in FIG. 11.

The second waterproof member 420 and the second force sensor 520 are substantially identical to the first waterproof member 410 and the first force sensor 510 shown in FIG. 26; and, therefore, the redundant description will be omitted.

Figure 29:
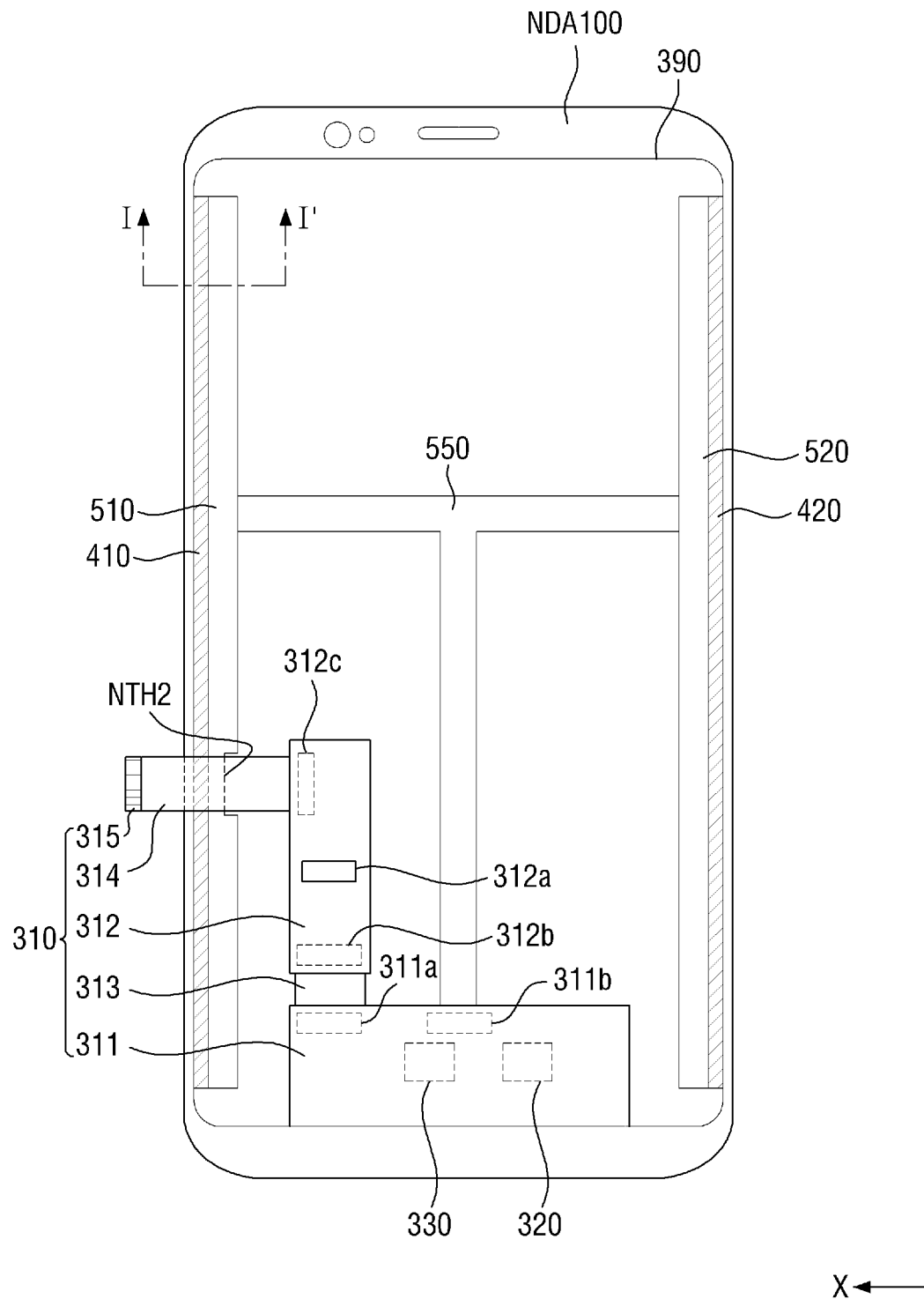
FIG. 29 is a bottom view of a display panel attached to a cover window according to yet another exemplary embodiment.

FIG. 29 is a bottom view of a display panel attached to a cover window according to yet another exemplary embodiment.

The exemplary embodiment shown in FIG. 29 is different from the exemplary embodiment shown in FIG. 15 in that a first waterproof member 410 is attached to the upper surface of a first force sensor 510 and a second waterproof member 420 is attached to the upper surface of a second force sensor 520. Accordingly, the elements of FIG. 29 identical to those of FIG. 15 will not be described to avoid redundancy.

Referring to FIG. 29, the first waterproof member 410 may be disposed on the upper and outer sides of the first force sensor 510. For example, when the first force sensor 510 is disposed at the right edge of the display panel 300 as shown in FIG. 29, the first waterproof member 410 may be disposed on the upper and right sides of the first force sensor. In this case, the lower surface of the panel support member 390, the upper surface of the frame 600, and the right side surface of the first force sensor 510 may be attached to the first waterproof member 410.

The second waterproof member 420 may be disposed on the upper and outer sides of the second force sensor 520. For example, when the second force sensor 520 is disposed at the left edge of the display panel 300 as shown in FIG. 29, the second waterproof member 420 may be disposed on the upper and left sides of the second force sensor. In this case, the lower surface of the panel support member 390, the upper surface of the frame 600 and the left side surface of the second force sensor 520 may be attached to the second waterproof member 420.

Figure 30:
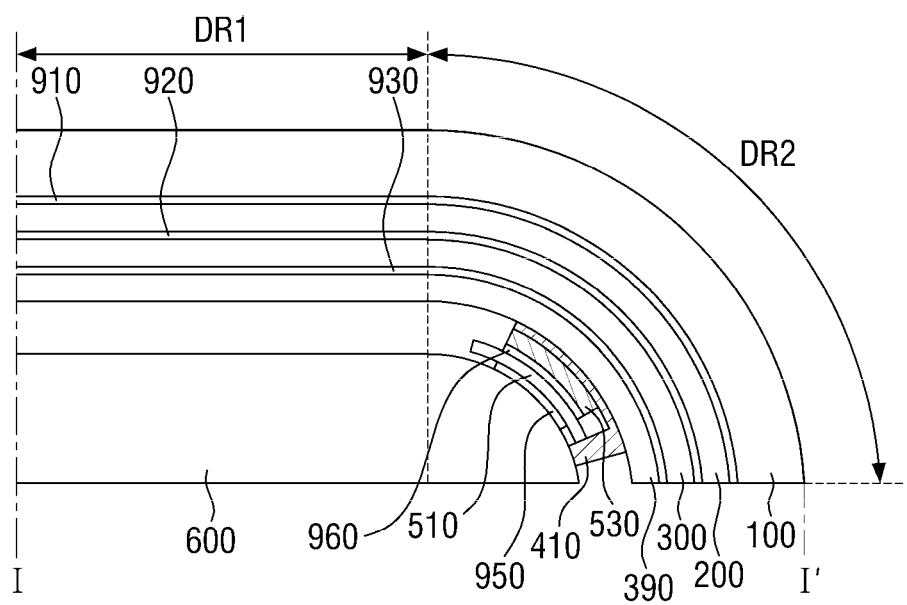
FIG. 30 is a cross-sectional view showing an exemplary embodiment, taken along line I-I' of FIGS. 16 and 29.
Figure 30:
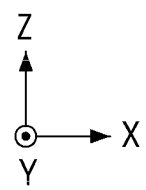

FIG. 30 is a cross-sectional view showing an example taken along line I-I' of FIGS. 16 and 29.

Referring to FIG. 30, a cover window 100, a touch sensing device 200, a display panel 300, a panel support member 390 and a frame 600 may be formed flat in the first region DR1 and may be formed as a curved surface in the second region DR2.

The first force sensor 510 may be disposed in the second region DR2 that corresponds to a curved portion of the display device 10. The first bumps 530 may be disposed on the upper surface of the first force sensor 510.

The first waterproof member 410 may be disposed on the upper and outer sides of the first force sensor 510. Specifically, the first waterproof member 410 may be disposed in an L-shape such that it surrounds the upper surface and a side surface of the first force sensor 510. The side surface of the first force sensor 510 may be disposed closer to the edge of one side of the display panel 300 than the other side surfaces thereof. For example, when the first force sensor 510 is disposed at the right edge of the display panel 300 as shown in FIG. 30, the first waterproof member 410 may be attached to the right side surface of the first force sensor 510.

The first waterproof member 410 may be disposed between the upper surface of the first force sensor 510 and the panel support member 390. The first waterproof member 410 may be disposed on one side of the first force sensor 510 and may be disposed between the lower surface of the panel support member 390 and the upper surface of the frame 600. Accordingly, the first force sensor 510 may be disposed between the lower surface of the panel support member 390 and the upper surface of the frame 600, and the lower surface of the panel support member 390 may be attached to the upper surface of the frame 600 by the first waterproof member 410. The lower surface of the first force sensor 510 may be attached to the upper surface of the frame 600 through a fifth adhesive member 950. The fifth adhesive member 950 may be a pressure-sensitive adhesive (PSA). The fifth adhesive member 950 may be omitted.

Figure 31:
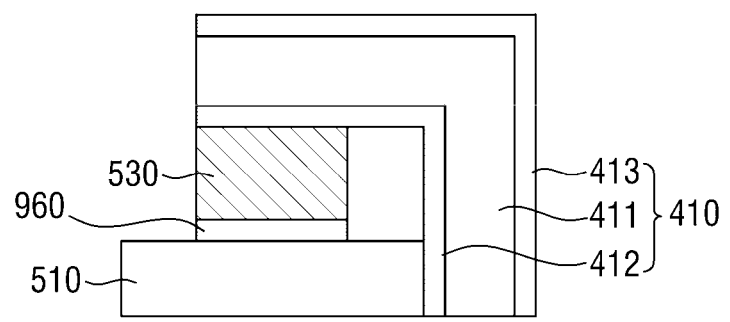
FIG. 31 is a cross-sectional view of an exemplary embodiment of the first force sensor, the first bump and the first waterproof member of FIG. 30.

Specifically, as shown in FIG. 31, the waterproof member 410 may include a base film 411, a first adhesive layer 412 disposed on a surface of the base film 411, and a second adhesive layer 413 disposed on the other surface of the base film 411. The first adhesive layer 412 may be attached to one side surface of the first force sensor 510 and the upper surface of the first bump 530. The second adhesive layer 413 may be attached to the lower surface of the panel support member 390. In addition, the side surface of the first adhesive layer 412 and the side surface of the second adhesive layer 413 may be attached to the upper surface of the frame 600 on the lower surface of the first waterproof member 410.

The base film 411 may be a polyethylene terephthalate (PET), a film in which polyethylene terephthalate (PET) is coupled with a cushion layer, or a polyethylene foam (PE-foam). The first adhesive layer 412 and the second adhesive layer 413 may be pressure-sensitive adhesives (PSA).

Figure 32:
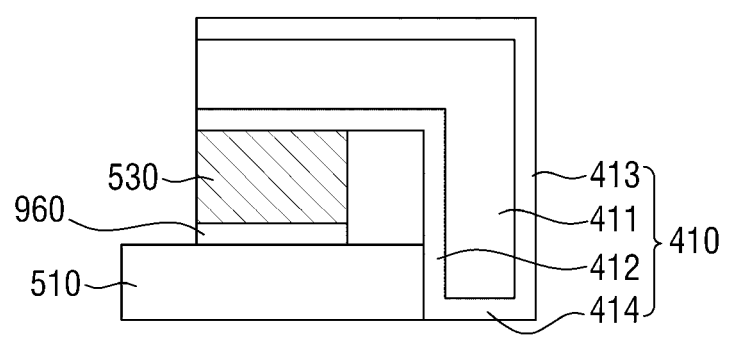
FIG. 32 is a cross-sectional view of another exemplary embodiment of the first force sensor, the first bump and the first waterproof member of FIG. 30.

In FIG. 31, the upper surface of the frame 600 is attached to the side surface of the first adhesive layer 412 and the side surface of the second adhesive layer 413. In this exemplary embodiment, since the contact area between the first waterproof member 410 and the frame 600 is small, the adhesive force between the first waterproof member 410 and the frame 600 may be weak. To improve the adhesive force, the first waterproof member 410 may include a third adhesive layer 414 disposed on the lower surface of the first waterproof member 410 that connects the first adhesive layer 412 with the second adhesive layer 413, as shown in FIG. 24. In this exemplary embodiment, the upper surface of the frame 600 may be attached to the upper surface of the third adhesive layer 414, as shown in FIG. 32. Therefore, according to the exemplary embodiment shown in FIG. 32, the contact area between the first waterproof member 410 and the frame 600 can be increased as compared with the exemplary embodiment shown in FIG. 31, so that the adhesive force between the first waterproof member 410 and the frame 600 can be enhanced.

Figure 33:
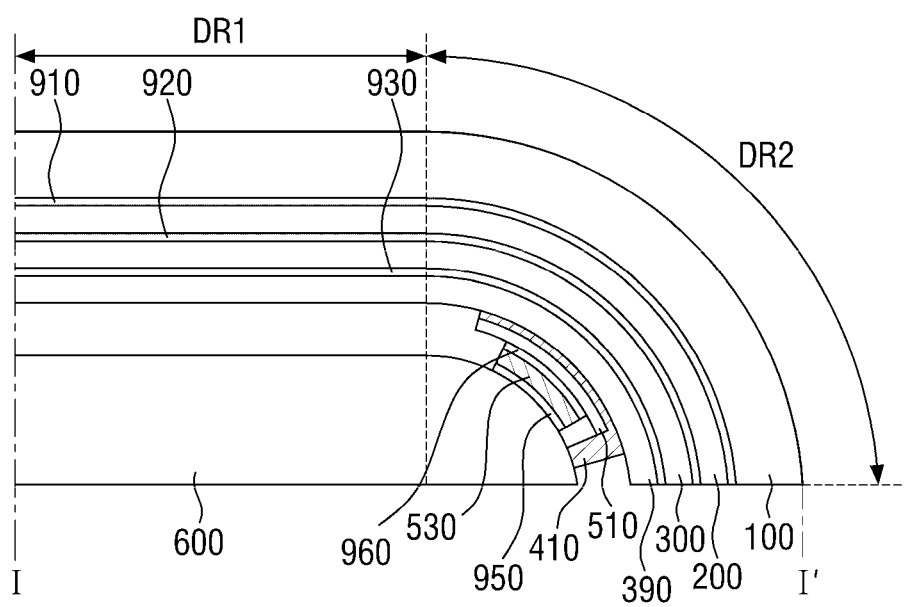
FIG. 33 is a cross-sectional view showing an exemplary embodiment, taken along line I-I' of FIGS. 16 and 29.

FIG. 33 is a cross-sectional view showing an exemplary embodiment, taken along line I-I' of FIGS. 16 and 29.

The exemplary embodiment shown in FIG. 33 is different from the exemplary embodiment shown in FIG. 30 in that each of the first bumps 530 is disposed under the first force sensor 510. Accordingly, the elements of FIG. 33 identical to those of FIG. 30 will not be described to avoid redundancy.

Referring to FIG. 33, the first waterproof member 410 may be disposed between the upper surface of the first force sensor 510 and the panel support member 390. The first waterproof member 410 may be disposed on one side of the first force sensor 510 and may be disposed between the lower surface of the panel support member 390 and the upper surface of the frame 600. Accordingly, the first force sensor 510 may be disposed between the lower surface of the panel support member 390 and the upper surface of the frame 600, and the lower surface of the panel support member 390 may be attached to the upper surface of the frame 600 by the first waterproof member 410. Each of the first bumps 530 may be disposed under the first force sensor 510 and may be attached to the upper surface of the frame 600 through the fifth adhesive member 950. The fifth adhesive member 950 may be a pressure-sensitive adhesive (PSA). The fifth adhesive member 950 may be omitted.

According to the exemplary embodiment shown in FIG. 33, the first bumps 530 are disposed under the first force sensor 510, and thus when a force is applied to the first force sensor 510, the lower surface of the first force sensor 510 can be pressed by the first bumps 530. Accordingly, the force applied by the user can be sensed by the first force sensor 510.

Figure 34:
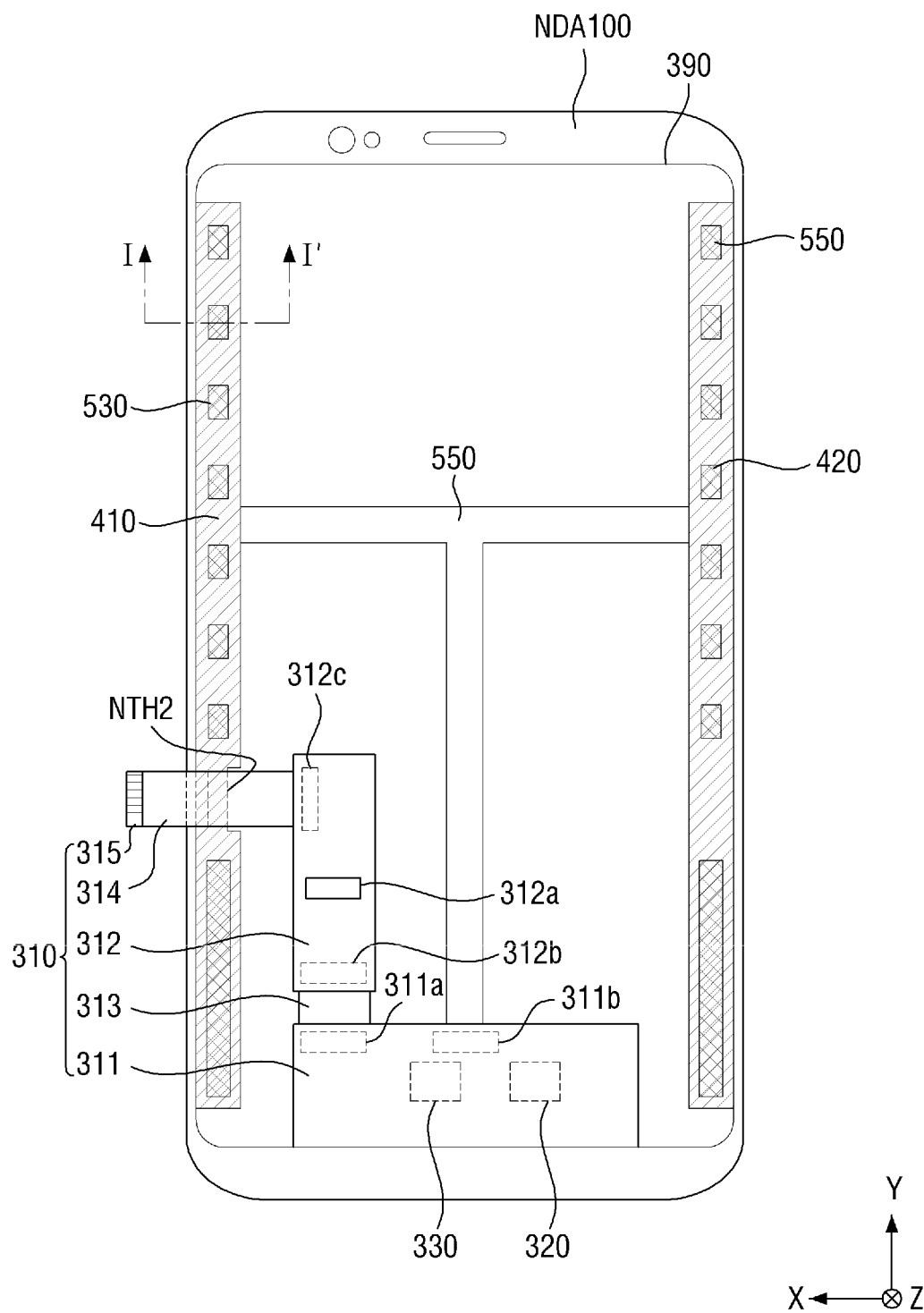
FIG. 34 is a bottom view of a display panel attached to a cover window according to yet another exemplary embodiment.

FIG. 34 is a bottom view of a display panel attached to a cover window according to yet another exemplary embodiment.

The exemplary embodiment shown in FIG. 34 is different from the exemplary embodiment shown in FIG. 15 in that the first bumps 530 are attached to the lower surface of the first force sensor 510 and are exposed without being covered by the first waterproof member 410. Accordingly, the elements of FIG. 29 identical to those of FIG. 15 will not be described to avoid redundancy.

Referring to FIG. 29, the first waterproof member 410 may expose the first bumps 530 attached to the lower surface of the first force sensor 510. The first waterproof member 410 may be disposed on the side surfaces of the first force sensor 510 and may be disposed on a part of the lower surface of the first force sensor 510 that is not covered by the first bumps 530. In addition, the first waterproof member 410 may be disposed on the side surfaces of the first bumps 530.

The second waterproof member 420 may expose the second bumps 540 attached to the lower surface of the second force sensor 520. The second waterproof member 420 may be disposed on the side surfaces of the second force sensor 520 and may be disposed on a part of the lower surface of the second force sensor 520 that is not covered by the second bumps 540. In addition, the second waterproof member 420 may be disposed on the side surfaces of the second bumps 540.

Figure 35:
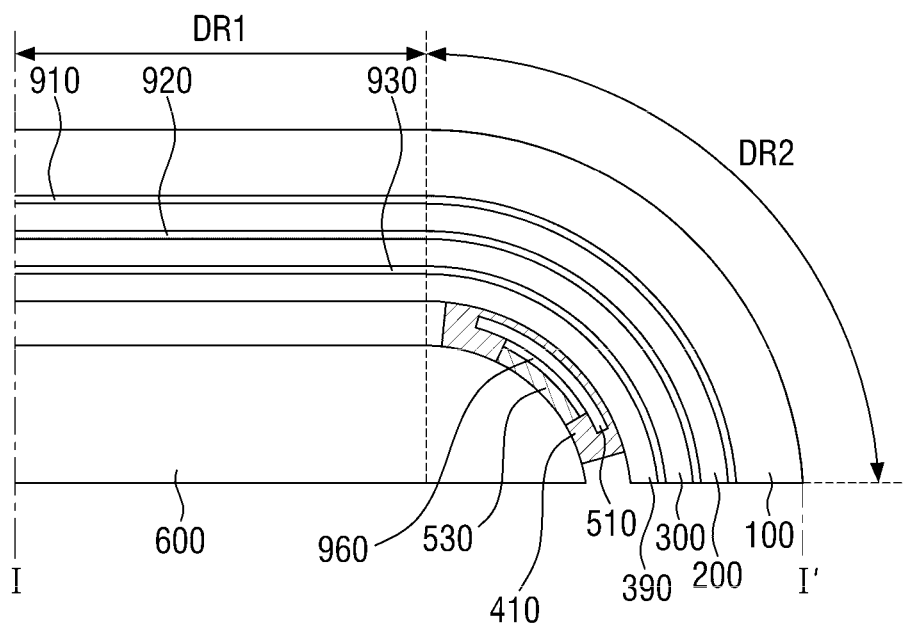
FIG. 35 is a cross-sectional view showing an exemplary embodiment, taken along line I-I' of FIGS. 16 and 34.
Figure 35:
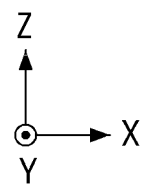

FIG. 35 is a cross-sectional view showing an exemplary embodiment, taken along line I-I' of FIGS. 16 and 34.

Referring to FIG. 35, a cover window 100, a touch sensing device 200, a display panel 300, a panel support member 390 and a frame 600 may be formed flat in the first region DR1 and may be formed as a curved surface in the second region DR2.

The first force sensor 510 may be disposed in the second region DR2 that corresponds to a curved portion of the display device 10. The first bumps 530 may be disposed on the upper surface of the first force sensor 510.

The first bumps 530 may be disposed on the lower surface of the first force sensor 510. The first waterproof member 410 may be disposed on the upper surface and side surfaces of the first force sensor 510 and may be disposed on a part of the lower surface of the first force sensor 510 that is not covered by the first bumps 530. In addition, the first waterproof member 410 may be disposed on the side surfaces of the first bumps 530.

The first waterproof member 410 may be disposed between the upper surface of the first force sensor 510 and the panel support member 390 and may be disposed between the part of the lower surface of the first force sensor 510 that is not covered by the first bumps 530 and the upper surface of the frame 600. Accordingly, the first force sensor 510 may be disposed between the lower surface of the panel support member 390 and the frame 600, and the lower surface of the panel support member 390 may be attached to the upper surface of the frame 600 by the first waterproof member 410.

Figure 36:
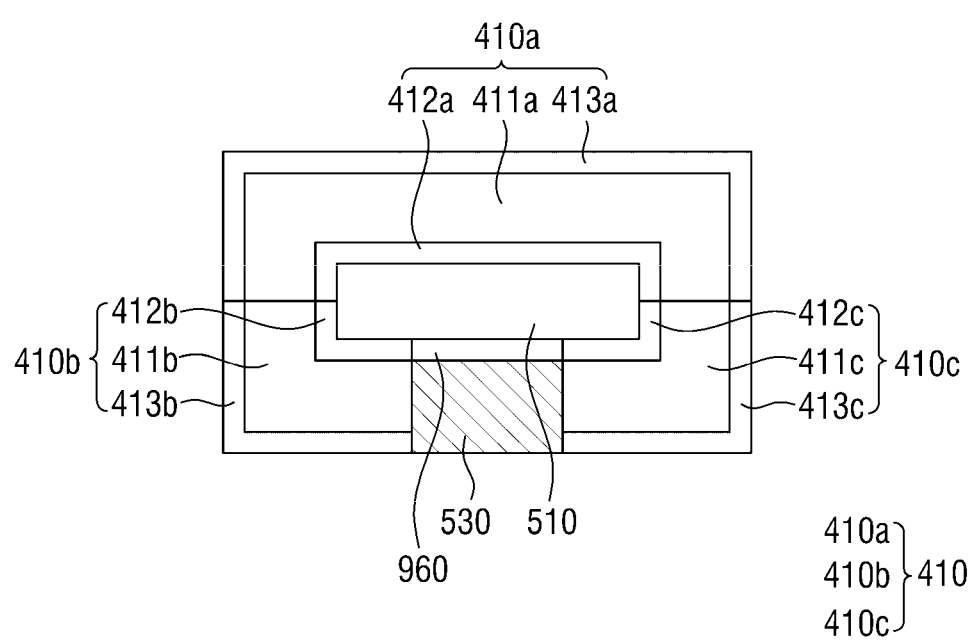
FIG. 36 is a cross-sectional view of an exemplary embodiment of the first force sensor, the first bump and the first waterproof member of FIG. 35.

Specifically, the first waterproof member 410 may include a 1A waterproof member 410a, a 1B waterproof member 410b and a 1C waterproof member 410c, as shown in FIG. 36. The 1A waterproof member 410a is disposed such that it surrounds the upper surface and the side surfaces of the first force sensor 510. The 1B waterproof member 410b is disposed such that it surrounds a part of the lower surface of the first force sensor 510 that is not covered by the first bump 530 and a part of the side surface of the first force sensor 510. The 1C waterproof member 410c is disposed such that it surrounds the other part of the lower surface of the first force sensor 510 that is not covered by the first bump 530 and the other part of the side surface of the first force sensor 510.

The 1A waterproof member 410a may include a 1A base film 411a, a 1A adhesive layer 412a disposed on one surface of the 1A base film 411a, and a 2A adhesive layer 413a disposed on the other surface of the 1A base film 411a. The 1A adhesive layer 412a may be attached to the upper surface and the side surfaces of the first force sensor 510. The 2A adhesive layer 413a may be attached to the lower surface of the panel support member 390.

The 1B waterproof member 410b may include a 1B base film 411b, a 1B adhesive layer 412b disposed on one surface of the 1B base film 411b, and a 2B adhesive layer 413b disposed on the other surface of the 1B base film 411b. The 1B adhesive layer 412b may be attached to a part of the lower surface of the first force sensor 510 that is exposed without being covered by the first bump 530. The 2B adhesive layer 413b may be attached to the upper surface of the frame 600. The side surface of the 1B adhesive layer 412b and the side surface of the 2B adhesive layer 413b may be attached to a part of each of the side surfaces of the first bump 530.

The 1C waterproof member 410c may include a 1C base film 411c, a 1C adhesive layer 412c disposed on a surface of the 1C base film 411c, and a 2C adhesive layer 413c disposed on the other surface of the 1C base film 411c. The 1C adhesive layer 412c may be attached to the rest of the lower surface of the first force sensor 510 that is exposed without being covered by the first bump 530. The 2C adhesive layer 413b may be attached to the upper surface of the frame 600. The side surface of the 1C adhesive layer 412c and the side surface of the 2C adhesive layer 413c may be attached to the rest part of each of the side surfaces of the first bump 530.

Each of the 1A base film 411a, and the 1B base film 411b and the 1C base film 411c may be a polyethylene terephthalate (PET), a film in which polyethylene terephthalate (PET) is coupled with a cushion layer, or a polyethylene foam (PE-foam). Each of the 1A adhesive layer 412a, the 2A adhesive layer 413a, the 1B adhesive layer 412b, the 2B adhesive layer 413b, the 1C adhesive layer 412c and the 2C adhesive layer 413c may be a pressure-sensitive adhesive (PSA).

Figure 37:
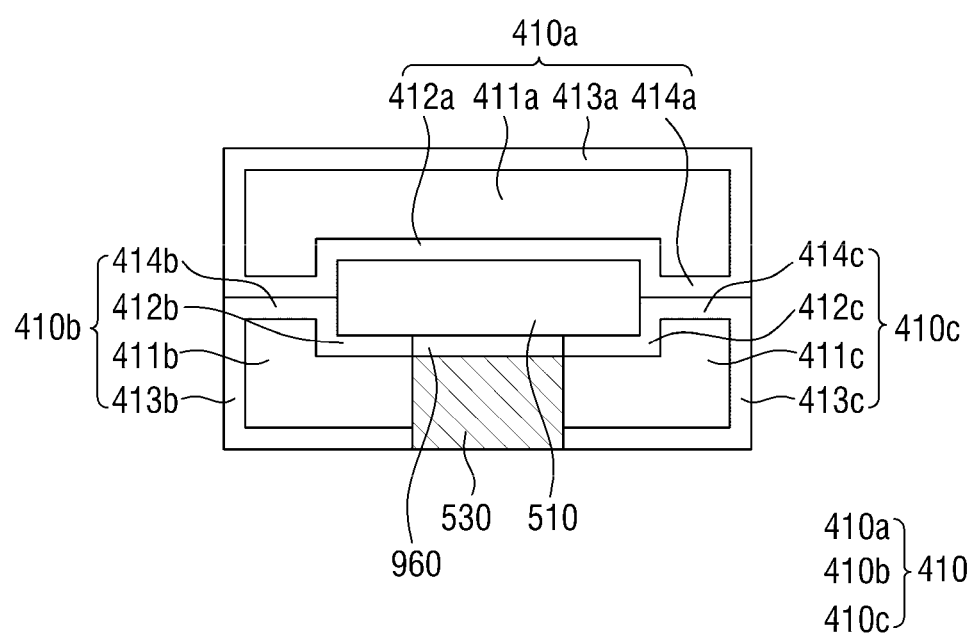
FIG. 37 is a cross-sectional view of another exemplary embodiment of the first force sensor, the first bump and the first waterproof member of FIG. 35.

In FIG. 36, the side surface of the 1B adhesive layer 412b is attached to the side surface of the 1A adhesive layer 412a, and the side surface of the 2B adhesive layer 413c is attached to the side surface of the 2A adhesive layer 413a. In addition, the side surface of the 1C adhesive layer 413c is attached to the side surface of the 1A adhesive layer 412a, and the side surface of the 2C adhesive layer 413c is attached to the side surface of the 2A adhesive layer 413a. In this exemplary embodiment, since the contact area between the 1A waterproof member 410a and the 1B waterproof member 410b and the contact area between the 1A waterproof member 410a and the 1C waterproof member 410c are small, the adhesive force between the 1A waterproof member 410a and the 1B waterproof member 410b and the adhesive force between the 1A waterproof member 410a and the 1C waterproof member 410c may be weak. To improve the adhesive force, the 1A waterproof member 410a may include a 3A adhesive layer 414a disposed on the lower surface of the 1A waterproof member 410a that connects the 1A adhesive layer 412a with the 2A adhesive layer 413a, as shown in FIG. 37. In addition, the 1B waterproof member 410b may include a 3B adhesive layer 414b disposed on the upper surface of the 1B waterproof member 410b that connects the 1B adhesive layer 412b with the 2B adhesive layer 413b. In addition, the 1C waterproof member 410c may include a 3C adhesive layer 414c disposed on the upper surface of the 1C waterproof member 410c that connects the 1C adhesive layer 412c with the 2C adhesive layer 413c. By doing so, the contact area between the 1A waterproof member 410a and the 1B waterproof member 410b and the contact area between the 1A waterproof member 410a and the 1C waterproof member 410c can be increased as shown in FIG. 28, so that the adhesive force between the 1A waterproof member 410a and the 1B waterproof member 410b and the adhesive force between the 1A waterproof member 410a and the 1C waterproof member 410c can be enhanced.

According to the exemplary embodiment shown in FIG. 35, the first waterproof member 410 is disposed on the upper surface, the lower surface and the side surfaces of the first force sensor 510 such that it attaches the lower surface of the panel support member 390 to the upper surface of the frame 600. Accordingly, it is possible to prevent or reduce moisture or dust from permeating between the display panel 300 and the frame 600 by the first waterproof member 410. That is to say, the display device 10 with waterproof and dustproof capabilities can be produced.

Moreover, according to the exemplary embodiment shown in FIG. 35, since the first waterproof member 410 and the first force sensor 510 can be integrally implemented, there is the advantage that it is not necessary to determine the height of the first waterproof member 410 by taking into account the height of the first force sensor 510 and the height of the first bumps 530, unlike the exemplary embodiment shown in FIG. 11.

Figure 38:
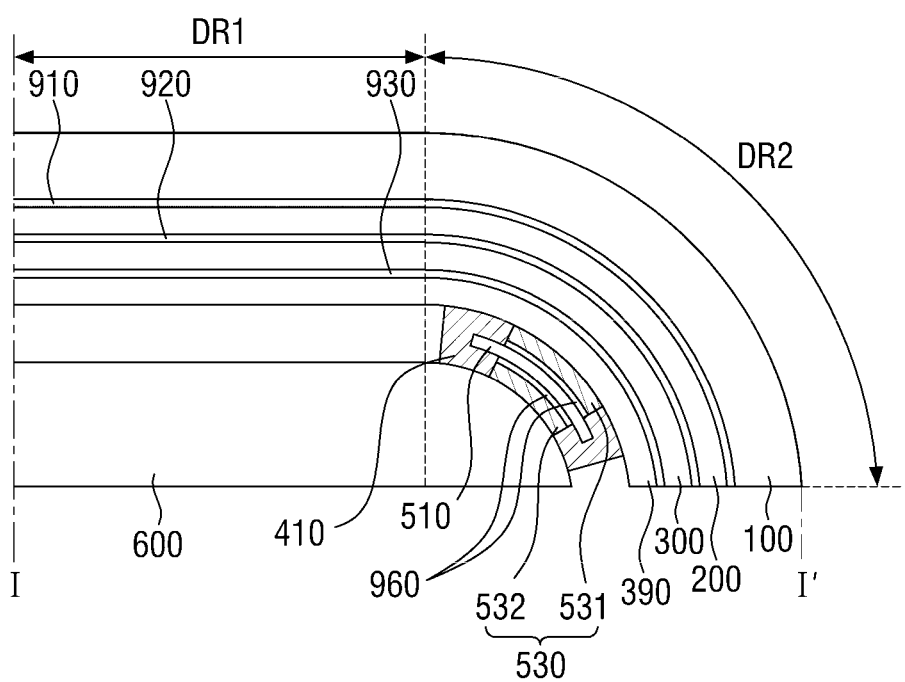
FIG. 38 is a cross-sectional view showing an exemplary embodiment, taken along line I-I' of FIGS. 16 and 34.
Figure 38:
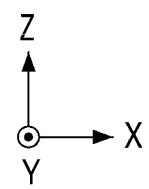

FIG. 38 is a cross-sectional view showing an exemplary embodiment, taken along line I-I' of FIGS. 16 and 34.

The exemplary embodiment shown in FIG. 38 is different from the exemplary embodiment shown in FIG. 35 in that a 1A bump 531 is disposed on a first force sensor 510 and a 1B bump 532 is disposed under the first force sensor 510. Accordingly, the elements of FIG. 38 identical to those of FIG. 35 will not be described to avoid redundancy.

Referring to FIG. 38, 1A bumps 531 may be disposed on the upper surface of a first force sensor 510, and 1B bumps 532 may be disposed on the lower surface of a first force sensor 510. The first waterproof member 410 may be disposed on the upper surface of the first force sensor 510 that is not covered by the 1A bumps 531 and the lower surface and side surfaces of the first force sensor 510 that is not covered by the 1B bumps 532. In addition, the first waterproof member 410 may be disposed on the side surfaces of the 1A bumps 531 and the side surfaces of the 1B bumps 532.

The first waterproof member 410 may be disposed between a part of the upper surface of the first force sensor 510 that is not covered by the 1A bumps 531 and the panel support member 390 and between a part of the lower surface of the first force sensor 510 that is not covered by the 1B bumps 532 and the upper surface of the frame 600. Accordingly, the first force sensor 510 may be disposed between lower surface of the panel support member 390 and the frame 600, and the lower surface of the panel support member 390 may be attached to the upper surface of the frame 600 by the first waterproof member 410.

Figure 39:
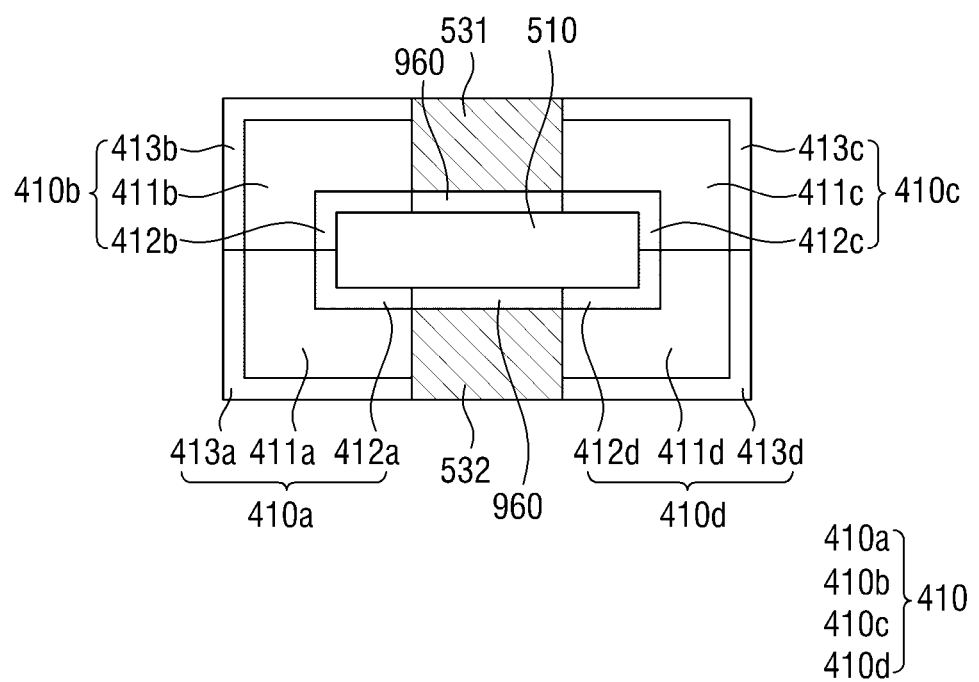
FIG. 39 is a cross-sectional view of an exemplary embodiment of the first force sensor, the first bump and the first waterproof member of FIG. 38.

Specifically, the first waterproof member 410 may include a 1A waterproof member 410a, a 1B waterproof member 410b, a 1C waterproof member 410c, and a 1D waterproof member 410d as shown in FIG. 39. The 1A waterproof member 410a is disposed such that it surrounds a part of the upper surface and a part of each of the side surfaces of the first force sensor 510 that are not covered by the 1A bumps 531. The 1B waterproof member 410b is disposed such that it surrounds a part of the lower surface and a part of each of the side surfaces of the first force sensor 510 that are not covered by the 1B bumps 532. The 1C waterproof member 410c is disposed such that it surrounds the other part of the lower surface and the other part of each of the side surfaces of the first force sensor 510 that is not covered by the 1B bump 530. The 1D waterproof member 410d is disposed such that it surrounds the other part of the upper surface and the other part of each of the side surfaces of the first force sensor 510 that are not covered by the 1A bumps 531.

The 1A waterproof member 410a may include a 1A base film 411a, a 1A adhesive layer 412a disposed on one surface of the 1A base film 411a, and a 2A adhesive layer 413a disposed on the other surface of the 1A base film 411a. The 1A adhesive layer 412a may be attached to a part of the upper surface and a part of each of the side surfaces of the first force sensor 510 that are exposed without being covered by the 1A bumps 531. The 2A adhesive layer 413a may be attached to the lower surface of the panel support member 390. The side surface of the 1A adhesive layer 412a and the side surface of the 2A adhesive layer 413a may be attached to a part of each of the side surfaces of the 1A bump 531.

The 1B waterproof member 410b may include a 1B base film 411b, a 1B adhesive layer 412b disposed on one surface of the 1B base film 411b, and a 2B adhesive layer 413b disposed on the other surface of the 1B base film 411b. The 1B adhesive layer 412b may be attached to a part of the lower surface and a part of each of the side surfaces of the first force sensor 510 that are exposed without being covered by the first bump 530. The 2B adhesive layer 413b may be attached to the upper surface of the frame 600. The side surface of the 1B adhesive layer 412b and the side surface of the 2B adhesive layer 413b may be attached to a part of each of the side surfaces of the 1B bump 532.

The 1C waterproof member 410c may include a 1C base film 411c, a 1C adhesive layer 412c disposed on a surface of the 1C base film 411c, and a 2C adhesive layer 413c disposed on the other surface of the 1C base film 411c. The 1C adhesive layer 412c may be attached to the other part of the lower surface and the other part of each of the side surfaces of the first force sensor 510 that are exposed without being covered by the first bump 530. The 2C adhesive layer 413b may be attached to the upper surface of the frame 600. The side surface of the 1C adhesive layer 412c and the side surface of the 2C adhesive layer 413c may be attached to the other part of each of the side surfaces of the 1B bump 532.

The 1D waterproof member 410d may include a 1D base film 411d, a 1D adhesive layer 412d disposed on a surface of the 1D base film 411d, and a 1D adhesive layer 413d disposed on the other surface of the 1D base film 411d. The 1D adhesive layer 412d may be attached to the other part of the upper surface and the other part of each of the side surfaces of the first force sensor 510 that are exposed without being covered by the 1A bumps 531. The 2D adhesive layer 413d may be attached to the lower surface of the panel support member 390. The side surface of the 2D adhesive layer 412d and the side surface of the 2D adhesive layer 413d may be attached to the other part of each of the side surfaces of the 1A bump 531.

Each of the 1A base film 411a, the 1B base film 411b, the 1C base film 411c and the first 1D base film 411d may be a polyethylene terephthalate (PET), a film in which polyethylene terephthalate (PET) is coupled with a cushion layer, or a polyethylene foam (PE-foam). Each of the 1A adhesive layer 412a, the 2A adhesive layer 413a, the 1B adhesive layer 412b, the 2B adhesive layer 413b, the 1C adhesive layer 412c, the 2C adhesive layer 413c, the 1D adhesive layer 412d and the 2D adhesive layer 413d may be a pressure-sensitive adhesive (PSA).

Figure 40:
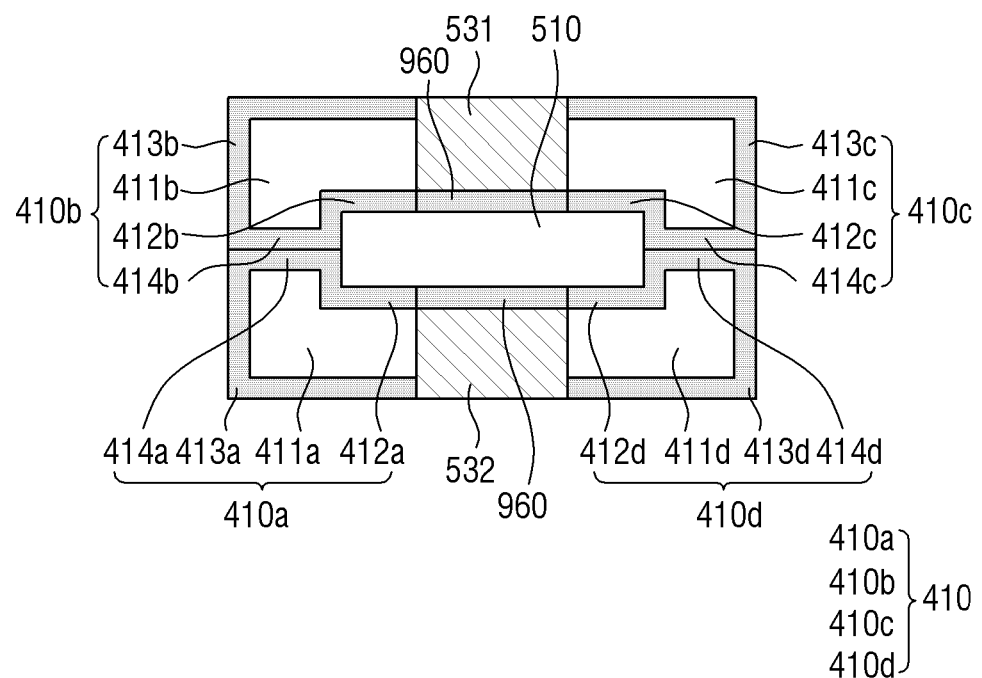
FIG. 40 is a cross-sectional view of another exemplary embodiment of the first force sensor, the first bump and the first waterproof member of FIG. 38.

In FIG. 39, the side surface of the 1B adhesive layer 412b is attached to the side surface of the 1A adhesive layer 412a, and the side surface of the 2B adhesive layer 413c is attached to the side surface of the 2A adhesive layer 413a. In addition, the side surface of the 1C adhesive layer 413c is attached to the side surface of the 1D adhesive layer 412d, and the side surface of the 2C adhesive layer 413c is attached to the side surface of the 2D adhesive layer 413d. In this exemplary embodiment, since the contact area between the 1A waterproof member 410a and the 1B waterproof member 410b and the contact area between the 1D waterproof member 410d and the 1C waterproof member 410c are small, the adhesive force between the 1A waterproof member 410a and the 1B waterproof member 410b and the adhesive force between the 1D waterproof member 410d and the 1C waterproof member 410c may be weak. To improve the adhesive force, the 1A waterproof member 410a may include a 3A adhesive layer 414a disposed on the lower surface of the 1A waterproof member 410a that connects the 1A adhesive layer 412a with the 2A adhesive layer 413a, as shown in FIG. 40. In addition, the 1B waterproof member 410b may include a 3B adhesive layer 414b disposed on the upper surface of the 1B waterproof member 410b that connects the 1B adhesive layer 412b with the 2B adhesive layer 413b. In addition, the 1C waterproof member 410c may include a 3C adhesive layer 414c disposed on the upper surface of the 1C waterproof member 410c that connects the 1C adhesive layer 412c with the 2C adhesive layer 413c. In addition, the 1D waterproof member 410d may include a 3D adhesive layer 414d disposed on the lower surface of the 1D waterproof member 410d that connects the 1D adhesive layer 412d with the 2D adhesive layer 413d. In this exemplary embodiment, as shown in FIG. 40, since the contact area between the 1A waterproof member 410a and the 1B waterproof member 410b and the contact area between the 1D waterproof member 410d and the 1C waterproof member 410c can be increased, the adhesive force between the 1A waterproof member 410a and the 1B waterproof member 410b and the adhesive force between the 1D waterproof member 410d and the 1C waterproof member 410c can be enhanced.

According to the exemplary embodiment shown in FIG. 38, the first waterproof member 410 is disposed on the upper surface, the lower surface and the side surfaces of the first force sensor 510 such that it attaches the lower surface of the panel support member 390 to the upper surface of the frame 600. Accordingly, it is possible to prevent or reduce moisture or dust from permeating between the display panel 300 and the frame 600 by the first waterproof member 410. That is to say, the display device 10 with waterproof and dustproof capabilities can be produced.

Moreover, according to the exemplary embodiment shown in FIG. 40, since the first waterproof member 410 and the first force sensor 510 can be integrally implemented, there is the advantage that it is not necessary to determine the height of the first waterproof member 410 by taking into account the height of the first force sensor 510 and the height of the first bumps 530, unlike the exemplary embodiment shown in FIG. 11.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:
1. A display device comprising:
  a display panel comprising a first region that is flat and a second region extending from a side of the flat region, the second region being curved or disposed at a obtuse angle from the first region;
  a frame disposed under the display panel;
  a first force sensor disposed between the frame and the second region of the display panel and having an upper surface, a lower surface, and a side surface;
  a first waterproof member disposed between the frame and the second region of the display panel and disposed on an outer side of the first force sensor, the first waterproof member having an L-shaped portion contacting the side surface of the first force sensor and one of the upper and lower surfaces of the first force sensor;
  a first bump disposed on one of the upper and lower surfaces of the first force sensor, a height of the first bump being greater than a height of the first force sensor
  wherein a height of the first waterproof member is greater than a sum of the height of the first force sensor and the height of the first bump.

2. The display device of claim 1, wherein the first force sensor comprises a force sensitive cell, and wherein an area of the first bump is smaller than an area of the force sensitive cell.

3. The display device of claim 2, wherein the force sensitive cell comprises a driving electrode and a sensing electrode disposed on a surface of a first substrate; and a force sensing layer disposed on a surface of a second substrate that faces the surface of the first substrate, wherein the first bump is smaller than the force sensing layer when viewed from a top.

4. The display device of claim 1, further comprising:

a first adhesive member for attaching the first force sensor to a lower surface of the display panel; and a second adhesive member for attaching the first force sensor to an upper surface of the frame, wherein the first waterproof member is attached to the lower surface of the display panel and the upper surface of the frame.

5. The display device of claim 1, wherein the frame comprises a groove formed in an upper surface of the frame, and the first force sensor and the first waterproof member are accommodated in the groove.

6. The display device of claim 5, wherein the height of the first waterproof member is larger than a height of the groove.

7. The display device of claim 1, further comprising: a second force sensor disposed under the display panel, wherein the first waterproof member is disposed on an outer side of the second force sensor.

8. The display device of claim 7, wherein the first force sensor is disposed on one side of the display panel while the second force sensor is disposed on an opposite side of the display panel.

9. A display device comprising:

a display panel comprising a first region that is flat and a second region extending from a side of the flat region, the second region being curved or disposed at a obtuse angle from the first region;

a first force sensor disposed under the second region of the display panel;

a first bump disposed on or under the first force sensor; and a first waterproof member having an L-shape and disposed under the second region of the display panel and disposed on an outer side of the first force sensor and on an upper surface or a lower surface of the first force sensor.

10. The display device of claim 9, wherein the first waterproof member is disposed between the upper surface of the first force sensor and a lower surface of the display panel.

11. The display device of claim 9, further comprising: a frame disposed under the first force sensor, wherein the first waterproof member is disposed between the lower surface of the first force sensor and an upper surface of the frame.

12. The display device of claim 11, wherein the first waterproof member comprises: a base film; a first adhesive layer disposed on a surface of the base film and attached to the upper surface or the lower surface of the first force sensor; and a second adhesive layer disposed on opposite surface of the base film and attached to a lower surface of the display panel or the upper surface of the frame.

13. The display device of claim 11, further comprising: a cable hole passing through the frame; a display circuit board attached to one side of the display panel and bent toward the lower surface of the display panel; and a cable connected to a connector of the display circuit board and passing through the cable hole.

14. The display device of claim 13, wherein the first force sensor comprises a first recess for exposing the cable hole on one side thereof, and the first waterproof member comprises a second recess for exposing the cable hole on one side thereof.

15. The display device of claim 14, wherein a width of the second recess is larger than a width of the first recess.

16. The display device of claim 14, further comprising: a main circuit board disposed under the frame, wherein the cable is connected to a main connector disposed on a lower surface of the main circuit board.

17. A display device comprising:

a display panel comprising a first region that is flat and a second region extending from a side of the flat region, the second region being curved or disposed at a obtuse angle from the first region;

a first force sensor disposed under the second region of the display panel;

a frame disposed under the first force sensor; and a first waterproof member disposed under the second region of the display panel and having a U-shape disposed between an upper surface of the first force sensor and a lower surface of the display panel and between a lower surface of the first force sensor and an upper surface of the frame.

18. The display device of claim 17, further comprising: a first bump disposed on the first force sensor, wherein the first waterproof member comprises: a 1A waterproof member disposed on a lower surface and a side surface of the first force sensor; and a 1B waterproof member disposed on an upper surface of the first bump.

19. The display device of claim 17, further comprising: a first bump disposed under the first force sensor, wherein the first waterproof member comprises: a 1A waterproof member disposed on an upper surface and a side surface of the first force sensor; and a 1B waterproof member disposed on a lower surface of the first bump.

20. The display device of claim 17, further comprising: a first bump disposed on the first force sensor, wherein the first waterproof member comprises a 1A waterproof member disposed on the lower surface of the first force sensor and side surfaces of the first force sensor; a 1B waterproof member disposed on a part of the upper surface of the first force sensor and a part of each of the side surfaces of the first force sensor that are exposed without being covered by the first bump; and a 1C waterproof member disposed on other part of the upper surface of the first force sensor and other part of each of the side surfaces of the first force sensor that are exposed without being covered by the first bump.

21. The display device of claim 17, further comprising: a first bump disposed under the first force sensor, wherein the first waterproof member comprises a 1A waterproof member disposed on the upper surface of the first force sensor and side surfaces of the first force sensor; a 1B waterproof member disposed on a part of the lower surface of the first force sensor and a part of each of the side surfaces of the first force sensor that are exposed without being covered by the first bump; and a 1C waterproof member disposed on other part of the lower surface of the first force sensor and other part of each of the side surfaces of the first force sensor that are exposed without being covered by the first bump.

22. The display device of claim 17, further comprising: a 1A bump disposed on the first force sensor; and a 1B bump disposed under the first force sensor, wherein the first waterproof member comprises: a 1A waterproof member disposed on a portion of the upper surface and a portion of side surfaces of the first force sensor that are exposed without being covered by the 1A bump; a 1B waterproof member disposed on a portion of the lower surface and a portion of the side surfaces of the first force sensor that are exposed without being covered by the 1B bump; a 1C waterproof member disposed on another portion of the lower surface and another portion of the side surfaces of the first force sensor that are exposed without being covered by the 1B bump; and a 1D waterproof member disposed on another portion of the upper surface and another portion of the side surfaces of the first force sensor that are exposed without being covered by the 1A bump.

* * * * *